United States Patent
Hayakawa et al.

(10) Patent No.: US 11,978,441 B2
(45) Date of Patent: May 7, 2024

(54) SPEECH RECOGNITION APPARATUS, METHOD AND NON-TRANSITORY COMPUTER-READABLE STORAGE MEDIUM

(71) Applicant: KABUSHIKI KAISHA TOSHIBA, Tokyo (JP)

(72) Inventors: Daichi Hayakawa, Inzai Chiba (JP); Takehiko Kagoshima, Yokohama Kanagawa (JP); Kenji Iwata, Machida Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 107 days.

(21) Appl. No.: 17/186,806

(22) Filed: Feb. 26, 2021

(65) Prior Publication Data
US 2022/0076667 A1    Mar. 10, 2022

(30) Foreign Application Priority Data
Sep. 8, 2020    (JP) .................................. 2020-150802

(51) Int. Cl.
*G10L 15/20*    (2006.01)
*G10L 15/06*    (2013.01)
*G10L 15/08*    (2006.01)

(52) U.S. Cl.
CPC ............ G10L 15/20 (2013.01); G10L 15/063 (2013.01); G10L 15/08 (2013.01)

(58) Field of Classification Search
CPC ......... G10L 15/20; G10L 15/63; G10L 15/08; G10L 15/063
See application file for complete search history.

(56) References Cited

U.S. PATENT DOCUMENTS

| | | | |
|---|---|---|---|
| 9,401,140 B1 * | 7/2016 | Weber | ...................... G10L 15/07 |
| 2004/0054531 A1 * | 3/2004 | Asano | ...................... G10L 15/20 |
| | | | 704/231 |

(Continued)

FOREIGN PATENT DOCUMENTS

| | | |
|---|---|---|
| JP | 2005-301097 A | 10/2005 |
| JP | 2005303898 A * | 10/2005 |
| WO | WO 2019/216414 A1 | 11/2019 |

OTHER PUBLICATIONS

Tang et al., "Low-Frequency Compensated Synthetic Impulse Responses For Improved Far-Field Speech Recognition," ICASSP 2020—2020 IEEE International Conference on Acoustics, Speech and Signal Processing (ICASSP), Apr. 9, 2020, pp. 6974-6978, doi: 10.1109/ICASSP40776.2020.9054454. (Year: 2020).*

(Continued)

*Primary Examiner* — Michelle M Koeth
(74) *Attorney, Agent, or Firm* — Knobbe, Martens, Olson & Bear, LLP

(57) ABSTRACT

According to one embodiment, a speech recognition apparatus includes processing circuitry. The processing circuitry generates, based on sensor information, environmental information relating to an environment in which the sensor information has been acquired, generates, based on the environmental information and generic speech data, an adapted acoustic model obtained by adapting a base acoustic model to the environment, acquires speech uttered in the environment as input speech data, and subjects the input speech data to a speech recognition process using the adapted acoustic model.

17 Claims, 16 Drawing Sheets

(56) References Cited

U.S. PATENT DOCUMENTS

| | | | | |
|---|---|---|---|---|
| 2008/0201136 | A1* | 8/2008 | Fujimura | G10L 15/32 704/E15.001 |
| 2012/0130716 | A1* | 5/2012 | Kim | G10L 15/20 901/50 |
| 2013/0231929 | A1* | 9/2013 | Komeji | G10L 15/20 704/233 |
| 2016/0027435 | A1* | 1/2016 | Pinto | G10L 15/26 704/244 |
| 2016/0260426 | A1* | 9/2016 | Kim | G10L 25/84 |
| 2019/0043514 | A1* | 2/2019 | Maziewski | G10L 15/34 |
| 2021/0058731 | A1 | 2/2021 | Koike et al. | |
| 2023/0177349 | A1* | 6/2023 | Balakrishnan | G06N 3/08 706/25 |

OTHER PUBLICATIONS

Kim et al., "Room Layout Estimation with Object and Material Attributes Information using a Spherical Camera," Centre for Vision Speech and Signal Processing, University of Surrey, FGA, University of Brasilia, 3DV, 2016, pp. 4321-4329 (Year: 2016).*

English Machine Translation of JP 2005303898-A (Year: 2005).*

Takiguchi, Tetsuya, et al. "Hands-free speech recognition by HMM composition in noisy reverberant environments." (1996).

Palacin et al., "Mobile Robot Self-Localization with 2D Push-Broom LIDAR in a 2D Map," Sensors 2020, 20, 2500, pp. 1-20,, http://www.mdpi.com/journal/sensors.

Allen et al., "Image method for efficiently simulating small-room acoustics," J. Acoust. Soc. Am, 65(4):943-950 (Apr. 1979).

Werbos, "Backpropagation Through Time: What It Does and How to Do It," Proceedings of the IEEE, 78(10):1550-1560 (Oct. 1990).

Pacheco et al., "A Single-Microphone Approach for Speech Signal Dereverberation," LINSE—Circuits and Signal Processing Laboratory Department of Electrical Engineering Federal University of Santa Catarina, 4 pgs.

Kim et al., "Linear RGB-D SLAM for Planar Environments," ECCV 2018 paper, Computer Vission Foundation, pp. 1-16, https://link.springer.com/conference/eccv (2018).

Kim et al., "Room Layout Estimation with Object and Material Attributes Information using a Spherical Camera," Centre for Vision Speech and Signal Processing, University of Surrey, FGA, University of Brasilia, 3DV, 2016, pp. 4321-4329.

Kim et al., "Generation of large-scale simulated utterances in virtual rooms to train deep-neural networks for far-field speech recognition in Google Home," INTERSPEECH 2017, pp. 379-383 http://dx.doi.org/10.21437/Interspeech.2017-1510 (Aug. 20-24, 2017).

Lee et al., "Real-time word confidence scoring using local posterior probabilities on tree trellis search," Conference Paper in Acoustics, Speech, and Signal Processing, 1988. ICASSP-88., 1988 International Conference on • Jun. 2004, pp. 793-796 https://www.researchgate.net/publication/224750575_Real-time_word_confidence_scoring_using_local_posterior_probabilities_on_tree_trellis_search?enrichId=rgreq-150691b5eb0710e88b669a16d8617c92-XXX8enrichSource=Y282ZXJOYWdjOziyNDc1MOU3NT1BUzoxMDExMTA5OTYwMTMwNjdAMTOwMTExIDE0OTMwMQ%3D&el=1_x_2&_esc=publicationCoverPdf.

* cited by examiner

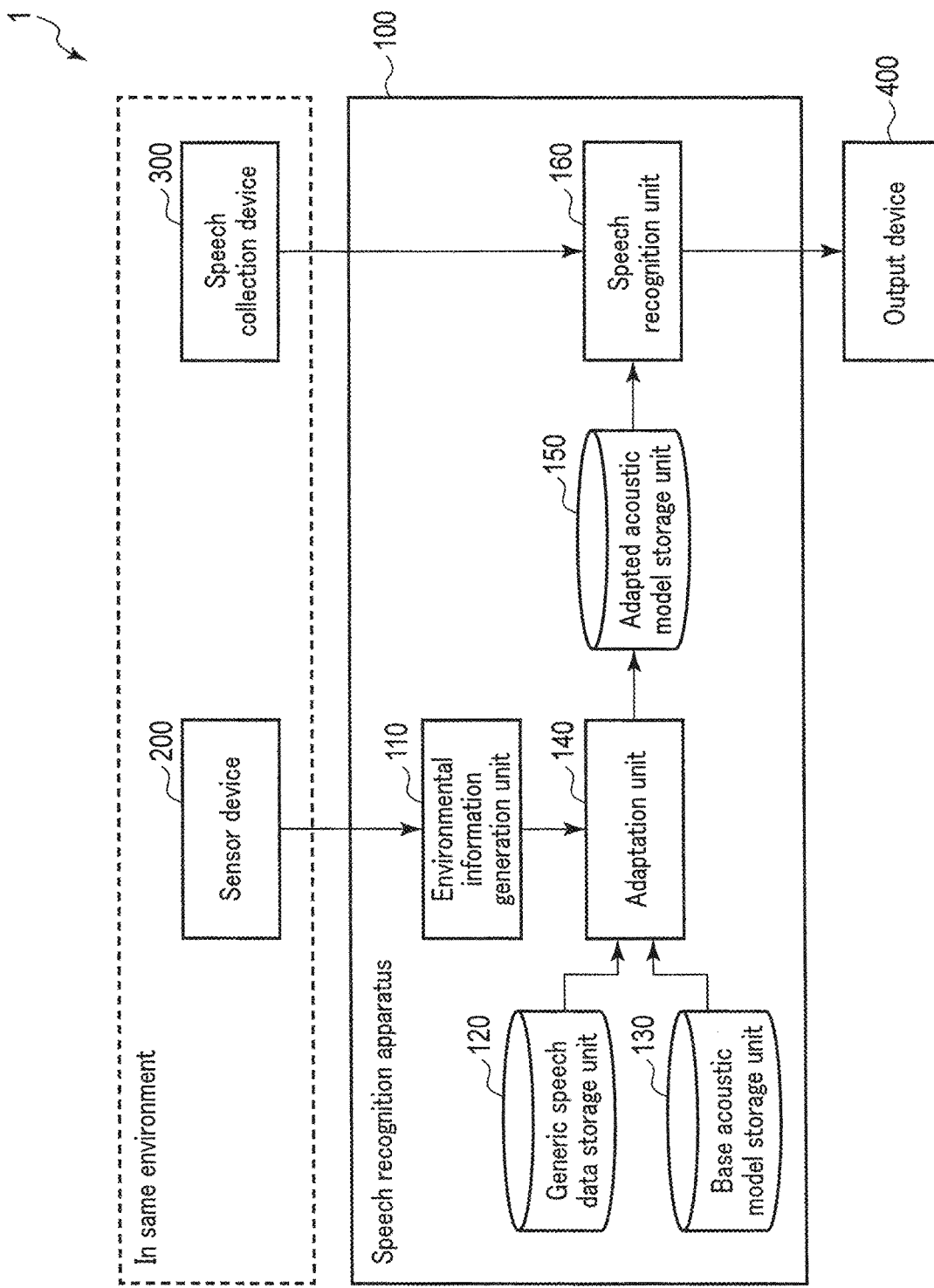
F I G. 1

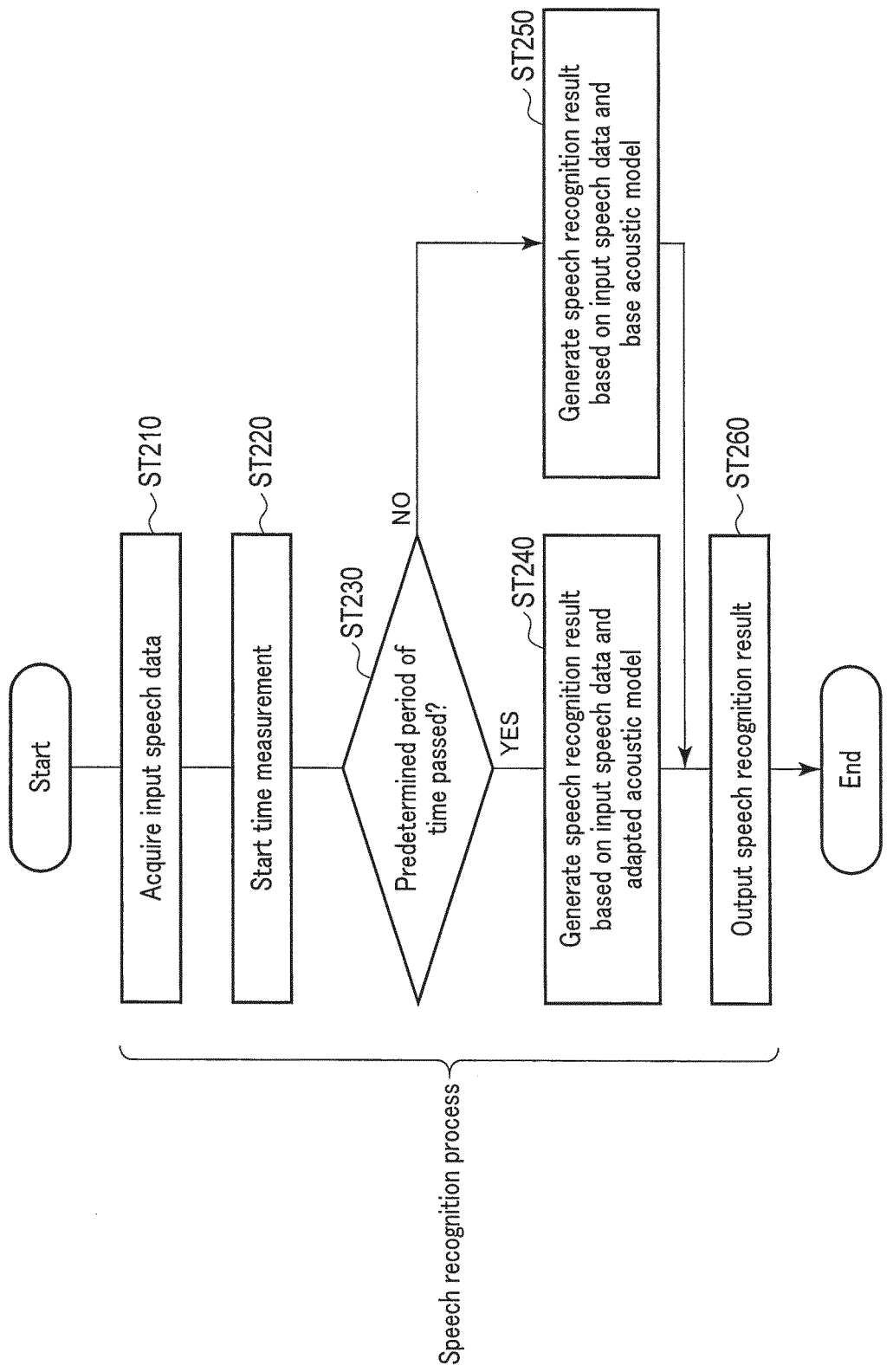
F I G. 10

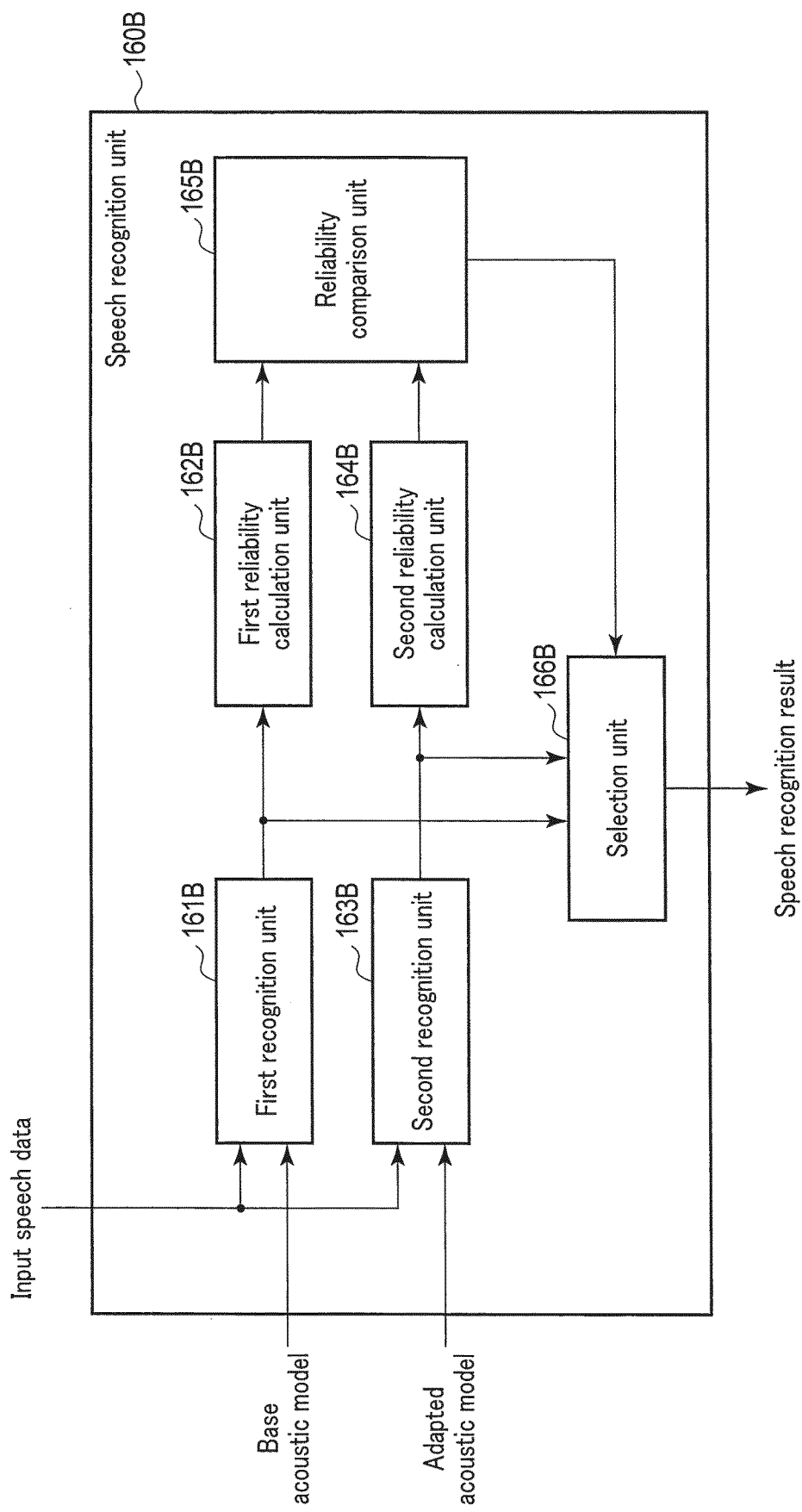
F I G. 11

SPEECH RECOGNITION APPARATUS, METHOD AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2020-150802, filed Sep. 8, 2020, the entire contents of which are incorporated herein by reference.

FIELD

Embodiments described herein relate generally to a speech recognition apparatus, a method and a non-transitory computer-readable storage medium.

BACKGROUND

Conventionally, there is a technique that enables speech recognition of speech data that is to be a target of recognition (target speech data) that has been observed by a microphone, using a base acoustic model that has been trained in advance on a large amount of generic speech data. The type and size of noise and the degree of reverberation differs according to the speech collection environment of the target speech data. This causes a problem wherein there is a reduction in speech recognition properties due to the differences between the speech collection environment of the generic speech data and the speech collection environment of the target speech data.

One of the techniques for solving such a problem is an acoustic model adaptation technique. In a conventional acoustic model adaptation, speech data recorded in the speech collection environment of target speech data is newly prepared, and a base acoustic model is relearned using the prepared speech data, thus obtaining an adapted acoustic model. It is thereby possible to suppress a decrease in speech recognition properties. However, in order to obtain the effect of the acoustic model adaptation, a large amount of speech data recorded in the speech collection environment needs to be prepared, which incurs a time cost.

As another technique for solving the problem, there is a technique of falsely generating speech containing reverberation and noise based on generic speech data, and adding the generated speech data to training data for an acoustic model, thereby suppressing a decrease in the speech recognition properties. For example, pseudo target speech data can be generated by randomly setting environmental information of a room (e.g., the size of the room, the reverberation time, the positions of the speech source and the noise source, the position of the microphone, etc.) and simulating, on a room simulator, a situation in which generic speech data from a speech source and noise data from a noise source are recorded in a reverberant room. In this technique, however, there is a possibility of a decrease in the speech recognition properties when there is a discrepancy between the environmental information set for the generation of the pseudo target speech data and the actual speech collection environment, since the environmental information of the room at the time of generation of the pseudo target speech data is randomly set.

BRIEF DESCRIPTION OF THE DRAWINGS

FIG. 1 is a block diagram illustrating a configuration of a speech recognition system which includes a speech recognition apparatus according to a first embodiment.

FIG. 10 is a flowchart illustrating a speech recognition process according to the second embodiment.

FIG. 11 is a block diagram illustrating a configuration of a speech recognition unit of a speech recognition apparatus according to a third embodiment.

DETAILED DESCRIPTION

Figure 2:
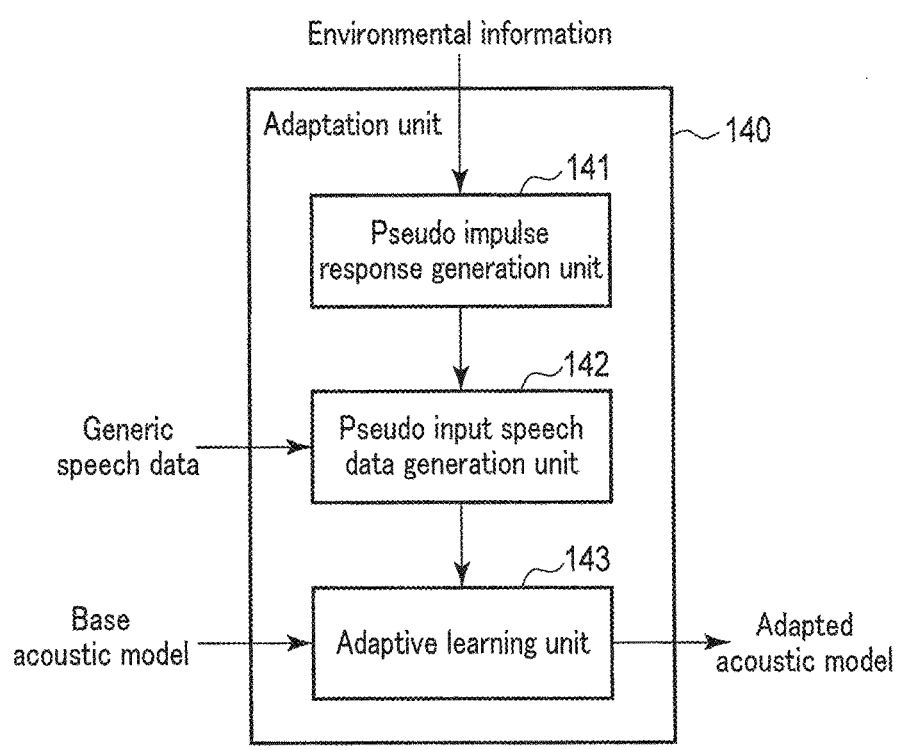
FIG. 2 is a block diagram illustrating a configuration of an adaptation unit in FIG. 1.

In general, according to one embodiment, a speech recognition apparatus includes processing circuitry. The processing circuitry generates, based on sensor information, environmental information relating to an environment in which the sensor information has been acquired, generates, based on the environmental information and generic speech data, an adapted acoustic model obtained by adapting a base acoustic model to the environment, acquires speech uttered in the environment as input speech data, and subjects the input speech data to a speech recognition process using the adapted acoustic model.

First, modeling of an observation signal using a microphone will be described. Let us assume a situation in which, for example, speech from a single speech source is collected by a single microphone in a room. At this time, an observation signal at the microphone can be modeled as in formula (1) as follows:

$$x(t)=s(t)*h(t) \qquad (1)$$

In formula (1), "t" denotes an index of time, "s(t)" denotes speech of a speech source, "x(t)" denotes an observation signal at the microphone, and "*" denotes a convolution operation. Also, "h(t)" denotes transmission properties between the speech source and the microphone, which is referred to as an "impulse response". If there is reverberation in the room, the reverberation properties such as the reverberation time and the degree of reverberation are denoted by h(t). Also, h(t) is dependent on the distance between the speech source and the microphone.

A method of falsely generating the impulse response will be described below. Hereinafter, a falsely generated impulse response will be referred to as a "pseudo impulse response". The pseudo impulse response can be generated by, for example, an acoustic simulation. In an acoustic simulation, the in-room situation (e.g., the size of the room, the reverberation properties, the position of the speech source, the position of the microphone, etc.) is discretionarily set, and a pseudo impulse response is generated. For the generation of the pseudo impulse response, a technique (e.g., an image method) described in, for example, Reference 1 (J. Allen and D. Berkeley, "Image method for efficiently simulating small-room acoustics", J. Acoust. Soc. Am., 1979) can be employed.

A method of falsely generating speech data in the in-room situation will be described below. It is desirable that the speech data be, for example, generic speech data that does not contain reverberation. Hereinafter, falsely generated speech data will be referred to as "pseudo speech data". For the generation of the pseudo speech data, given generic speech data is selected, and is assumed to be the speech of the speech source. Based on formula (1), the selected generic speech data and the pseudo impulse response generated by the acoustic simulation are subjected to a convolution operation, and thereby pseudo speech data is generated.

Hereinafter, embodiments of the speech recognition apparatus will be described in detail with reference to the accompanying drawings.

First Embodiment

FIG. 1 is a block diagram illustrating a configuration of a speech recognition system which includes a speech recognition apparatus according to a first embodiment. The speech recognition system 1 includes a speech recognition apparatus 100, a sensor device 200, a speech collection device 300, and an output device 400. When the speech recognition system 1 is used, the sensor device 200 and the speech collection device 300 are installed in the same environment. Being in the same environment means, for example, being in the same space. The "space" refers to a room, a hall, etc. in which reverberation occurs after the generated sound. Hereinafter, let us assume that the sensor device 200 and the speech collection device 300 are installed in the same environment. The "same environment" may be rephrased as "speech collection environment".

The sensor device 200 acquires in-space information in the installation environment as sensor information. The sensor information includes, for example, at least one of acoustic data, image data, and point cloud data. The sensor device 200 outputs the acquired sensor information to the speech recognition apparatus 100. The acoustic data may contain speech data. The "environment in which sensor information has been acquired" may be rephrased as "speech collection environment".

Specifically, the sensor device 200 is, for example, at least one of a microphone, a camera, an RGB-D sensor, and a LiDAR (laser imaging, detection, and ranging) device. When acoustic data is to be acquired, the sensor device 200 is a microphone. When image data is to be acquired, the sensor device 200 is a camera and an RGB-D sensor. When point cloud data is to be acquired, the sensor device 200 is a LiDAR device. For acquisition of the acoustic data, the sensor device 200 may be a microphone attached to a camera. Hereinafter, a device used for in-space visualization such as a camera, an RGB-D sensor, or a LiDAR device will be referred to as an imaging device.

The speech collection device 300 acquires speech data that is to be a target of speech recognition. The speech collection device 300 is, for example, a microphone. The speech collection device 300 outputs the acquired speech data to the speech recognition apparatus 100. Hereinafter, the speech data acquired in the speech collection device 300 will be referred to as "input speech data". The speech collection device 300 may acquire acoustic data. In this case, the speech collection device 300 may also function as the sensor device 200.

The speech recognition apparatus 100 comprises an environmental information generation unit 110, a generic speech data storage unit 120, a base acoustic model storage unit 130, an adaptation unit 140, an adapted acoustic model storage unit 150, and a speech recognition unit 160. The speech recognition apparatus 100 may comprise an acquisition unit that acquires input speech data and an input speech data storage unit that stores the input speech data. The generic speech data storage unit 120, the base acoustic model storage unit 130, and the adapted acoustic model storage unit 150 may be integrated into one or more storage units, or may be provided outside the speech recognition apparatus 100.

The environmental information generation unit 110 receives sensor information from the sensor device 200. The environmental information generation unit 110 generates environmental information based on the sensor information. The environmental information relates to an environment in which the sensor information has been acquired. The environmental information generation unit 110 outputs the generated environmental information to the adaptation unit 140.

Specifically, the environmental information contains, for example, at least one of an impulse response between the generation source of speech and the speech collection device that collects the speech, and information on the breadth of the space in the speech collection environment.

When the sensor information is acoustic data, the environmental information generation unit 110 generates an impulse response based on the acoustic data. For the generation of the impulse response based on acoustic data, the technique described in, for example, Reference 2 (F. S. Pacheco and R. Seara, "A single-microphone approach for speech signal dereverberation," EUSIPCO, 2005) may be used.

When the sensor information is image data or point cloud data, the environmental information generation unit 110 generates information on the breadth of the space based on the image data or the point cloud data. For generation of the information on the breadth of the space based on the image data or the point cloud data, the techniques described in, for example, Reference 3 (H. Kim, et al., "Room Layout Estimation with Object and Material Attributes Information Using a Spherical Camera," 3DV, 2016), Reference 4 (P. Kim, et al., "Linear RGB-D SLAM for Planar Environments," ECCV, 2018), and Reference 5 (J. Palacin, et al., "Mobile Robot Self-Localization with 2D Push-Broom LIDAR in a 2D Map," Sensors 2020) may be employed.

The environmental information generation unit 110 may generate both the impulse response and the information on the breadth of the space.

The generic speech data storage unit 120 stores generic speech data. It is desirable that the generic speech data be, for example, speech data that does not contain reverberation. The generic speech data storage unit 120 outputs the generic speech data to the adaptation unit 140.

The base acoustic model storage unit 130 stores a base acoustic model. The base acoustic model is, for example, a trained model that has been trained in advance on speech data based on a machine learning method. Examples of the machine learning method that may be employed include a deep neural network (DNN). The base acoustic model storage unit 130 outputs a base acoustic model to the adaptation unit 140. When the base acoustic model is a trained model, speech data contained in the training data for the base acoustic model may be used as the generic speech data. In this case, the generic speech data storage unit 120 may be omitted.

The adaptation unit 140 receives environmental information from the environmental information generation unit 110, receives generic speech data from the generic speech data storage unit 120, and receives a base acoustic model from the base acoustic model storage unit 130. The adaptation unit 140 generates an adapted acoustic model based on the environmental information, the generic speech data, and the base acoustic model. The adaptation unit 140 outputs the generated adapted acoustic model to the adapted acoustic model storage unit 150.

Specifically, the adapted acoustic model is an acoustic model that has been adapted to an environment (speech collection environment) in which sensor information has been acquired. The adaptation unit 140 generates pseudo input speech data that mimics the speech uttered in the speech collection environment based on the environmental information and the generic speech data, and generates the adapted acoustic model using the pseudo input speech data. The adaptation unit 140 may calculate a reverberation time of the space in the speech collection environment based on the input speech data. Next, a more concrete configuration of the adaptation unit 140 will be described with reference to FIG. 2.

FIG. 2 is a block diagram illustrating a configuration of the adaptation unit in FIG. 1. The adaptation unit 140 includes a pseudo impulse response generation unit 141, a pseudo input speech data generation unit 142, and an adaptive learning unit 143.

The pseudo impulse response generation unit 141 receives environmental information from the environmental information generation unit 110. The pseudo impulse response generation unit 141 generates a pseudo impulse response based on the environmental information. The pseudo impulse response generation unit 141 outputs the pseudo impulse response to the pseudo input speech data generation unit 142.

Specifically, the pseudo impulse response generation unit 141 generates, based on the environmental information, a pseudo impulse response that mimics an impulse response between the generation source of the speech and the speech collection device that collects the speech. When the environmental information contains an impulse response, the pseudo impulse response generation unit 141 performs a predetermined operation on the impulse response, and thereby generates a pseudo impulse response. The predetermined operation is, for example, at least one of an increase in the waveform of the impulse response in the time direction, a decrease in the waveform of the impulse response in the time direction, and a change in the peak value of the waveform of the impulse response. When the environmental information contains information on the breadth of the space in the speech collection environment, the pseudo impulse response generation unit 141 generates a pseudo impulse response based on the information on the breadth of the space and the reverberation time of the space.

The pseudo input speech data generation unit 142 receives generic speech data from the generic speech data storage unit 120, and receives the pseudo impulse response from the pseudo impulse response generation unit 141. The pseudo input speech data generation unit 142 generates pseudo input speech data based on the generic speech data and the pseudo impulse response. The pseudo input speech data generation unit 142 outputs pseudo input speech data to the adaptive learning unit 143.

Specifically, the pseudo input speech data generation unit 142 generates the pseudo input speech data by performing a convolution operation of the generic speech data with the pseudo impulse response.

The adaptive learning unit 143 receives a base acoustic model from the base acoustic model storage unit 130, and receives pseudo input speech data from the pseudo input speech data generation unit 142. The adaptive learning unit 143 generates an adapted acoustic model by adapting the pseudo input speech data to the base acoustic model. The adaptive learning unit 143 outputs the adapted acoustic model to the adapted acoustic model storage unit 150.

When the base acoustic model is configured of a DNN, the adapted acoustic model is also configured of a DNN. Accordingly, the adapted acoustic model is generated by, using a parameter of the base acoustic model as an initial value, optimizing the parameter. For the optimization of the parameter, the technique described in, for example, Reference 6 (P. J. Werbos, "Backpropagation Through Time: What It Does and How to Do It," Proceedings of the IEEE, vol. 78, no. 10, 1990.) may be employed. That is, the adaptive learning unit 143 generates an adapted acoustic model by optimizing the parameter of the base acoustic model. The "optimizing the parameter" may be rephrased as "learning a parameter".

The adapted acoustic model storage unit 150 receives an adapted acoustic model from the adaptation unit 140, and stores the adapted acoustic model. The adapted acoustic model storage unit 150 outputs the adapted acoustic model to the speech recognition unit 160.

The speech recognition unit 160 receives input speech data from the speech collection device 300, and receives the adapted acoustic model from the adapted acoustic model storage unit 150. The speech recognition unit 160 subjects the input speech data to a speech recognition process using the adapted acoustic model, and thereby generates a speech recognition result. The speech recognition unit 160 outputs the generated speech recognition result to the output device 400.

The output device 400 receives the speech recognition result from the speech recognition unit 160. The output device 400 converts the speech recognition result in a desired display format or speech format, and presents it to the user.

Figure 3:
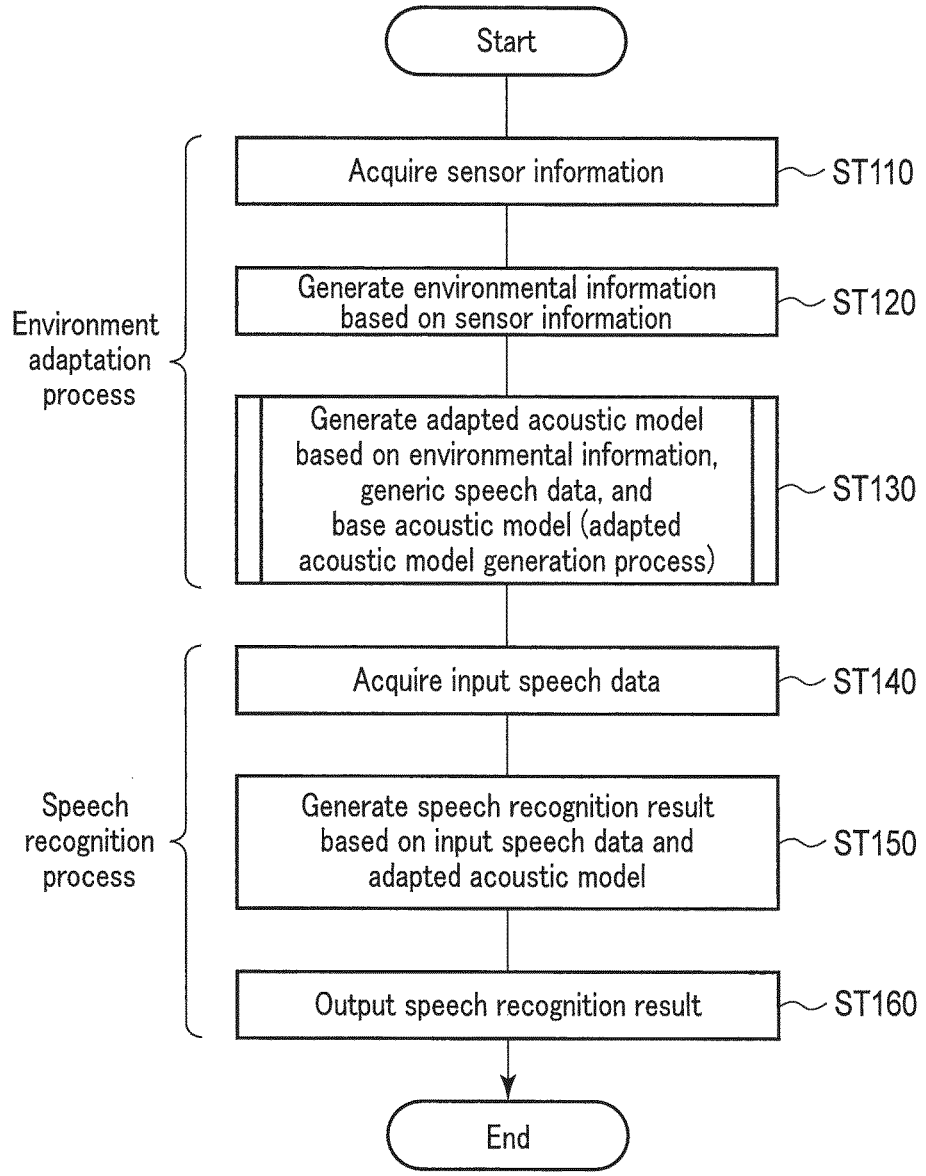
FIG. 3 is a flowchart illustrating an operation of the speech recognition apparatus in FIG. 1.

FIG. 3 is a flowchart illustrating an operation of the speech recognition apparatus in FIG. 1. The flowchart in FIG. 3 is divided into an environment adaptation process from step ST110 to step ST130 and a speech recognition process from step ST140 to step ST160. The environment adaptation process and the speech recognition process need not be performed in series. Specifically, the processing may be temporarily interrupted upon completion of the environment adaptation process, and the speech recognition process may be started at a given timing. The given timing is, for example, an instruction from the user or a passage of a predetermined period of time.

(Step ST110)

The speech recognition apparatus 100 acquires sensor information from the sensor device 200.

(Step ST120)

After acquiring the sensor information, the environmental information generation unit 110 generates environmental information based on the sensor information.

(Step ST130)

After generating the environmental information, the adaptation unit 140 generates an adapted acoustic model based on the environmental information, the generic speech data, and the base acoustic model. Hereinafter, the process at step ST130 will be referred to as an "adapted acoustic model generation process". A specific example of the adapted acoustic model generation process will be described with reference to the flowchart in FIG. 4.

Figure 4:
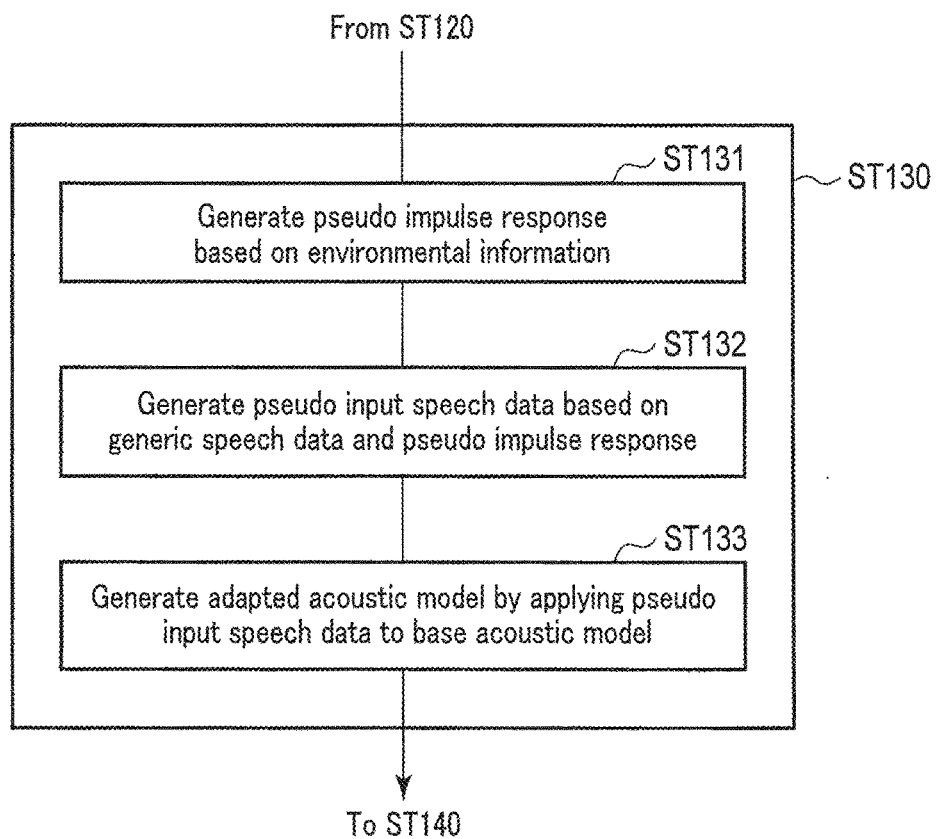
FIG. 4 is a flowchart illustrating an adapted acoustic model generation process of the flowchart in FIG. 3.

FIG. 4 is a flowchart illustrating an adapted acoustic model generation process of the flowchart in FIG. 3. The flowchart in FIG. 4 continues from step ST120.

(Step ST131)

After generating the environmental information, the pseudo impulse response generation unit 141 generates a pseudo impulse response based on the environmental information. The generation of the pseudo impulse response will be described in detail below, with respect to each of the case where the environmental information contains an impulse response and the case where the environmental information contains information on the breadth of the space in the speech collection environment.

When the environmental information contains an impulse response, the pseudo impulse response generation unit 141 may use the impulse response as the pseudo impulse response. When the impulse response is an impulse response that is based on acoustic data acquired by a microphone that functions as the sensor device 200, such an impulse response may not necessarily correspond to the impulse response that is based on input speech data acquired by the speech collection device 300. Even when the impulse response is an impulse response that is based on the input speech data acquired by the speech collection device 300, a slight variation, if any, in the orientation of the speaker who makes a speech or the position of the speaker (speech generation source) causes the impulse response to take a different value. To address the above-described circumstances, it is desirable that the pseudo impulse response generation unit 141 generate a plurality of pseudo impulse responses by causing minor variations in the impulse response. A method of generating a plurality of pseudo impulse responses from the impulse response will be described with reference to FIGS. 5 and 6.

Figure 5:
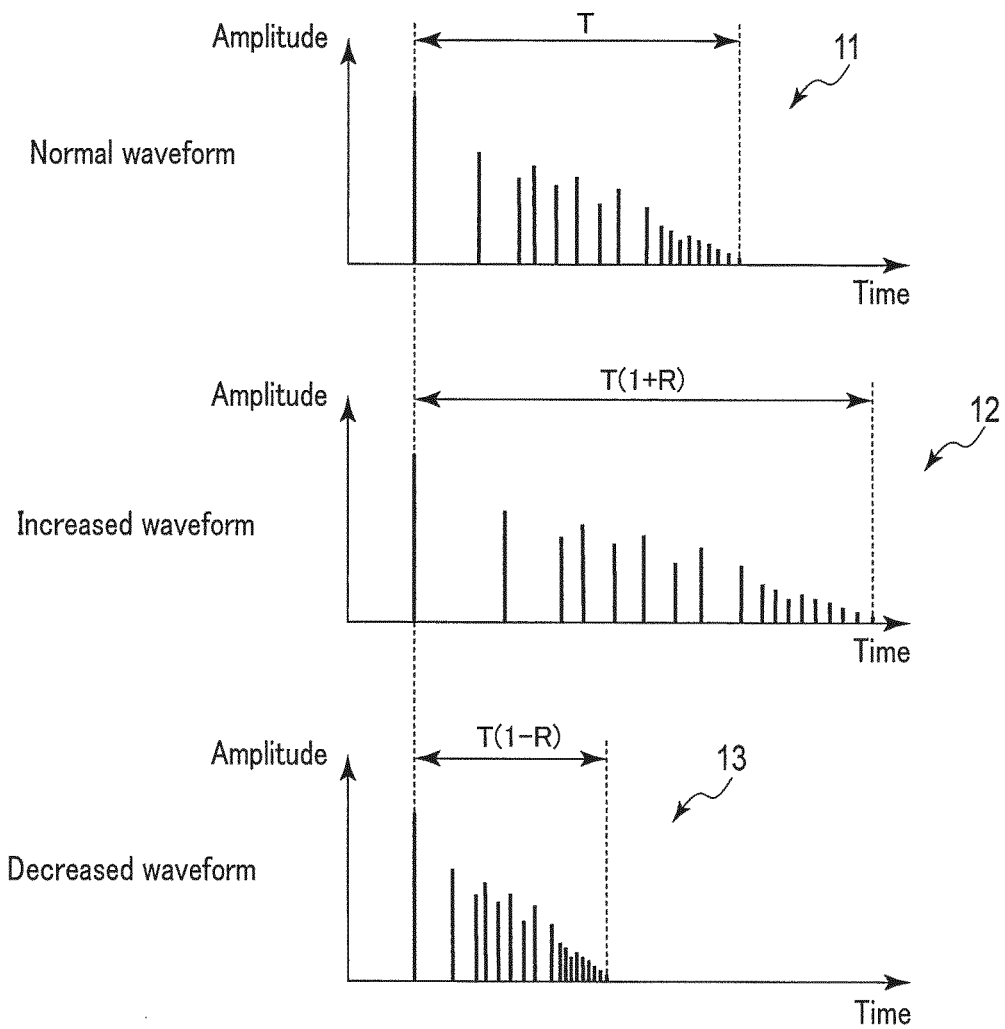
FIG. 5 is a diagram illustrating a method of generating a pseudo impulse response according to the first embodiment.

FIG. 5 is a diagram illustrating a method of generating a pseudo impulse response according to the first embodiment. FIG. 5 illustrates waveforms 11 to 13 of three impulse responses. A waveform 11 is, for example, actually obtained as environmental information. The waveform 11 has, for example, a time width T. The waveform 12 is obtained by increasing the waveform 11 in the time direction. The waveform 13 is obtained by increasing the waveform 11 in the time direction. The waveforms 11 to 13 may be respectively referred to as a normal waveform, an increased waveform, and a decreased waveform.

The pseudo impulse response generation unit 141 generates an increased waveform or a decreased waveform by increasing or decreasing the waveform 11 of the impulse response in the time direction. Specifically, the pseudo impulse response generation unit 141 generates the waveform 12 having a time width T(1+R) by multiplying the time width T of the waveform 11 by (1+R) in the time direction. Also, the pseudo impulse response generation unit 141 generates the waveform 13 having a time width T (1−R) by multiplying the time width T of the waveform 11 by (1−R) in the time direction. At this time, R is a random real number ranging from, for example, "0" to "1". It is desirable that R be on the order of "0.01".

Figure 6:
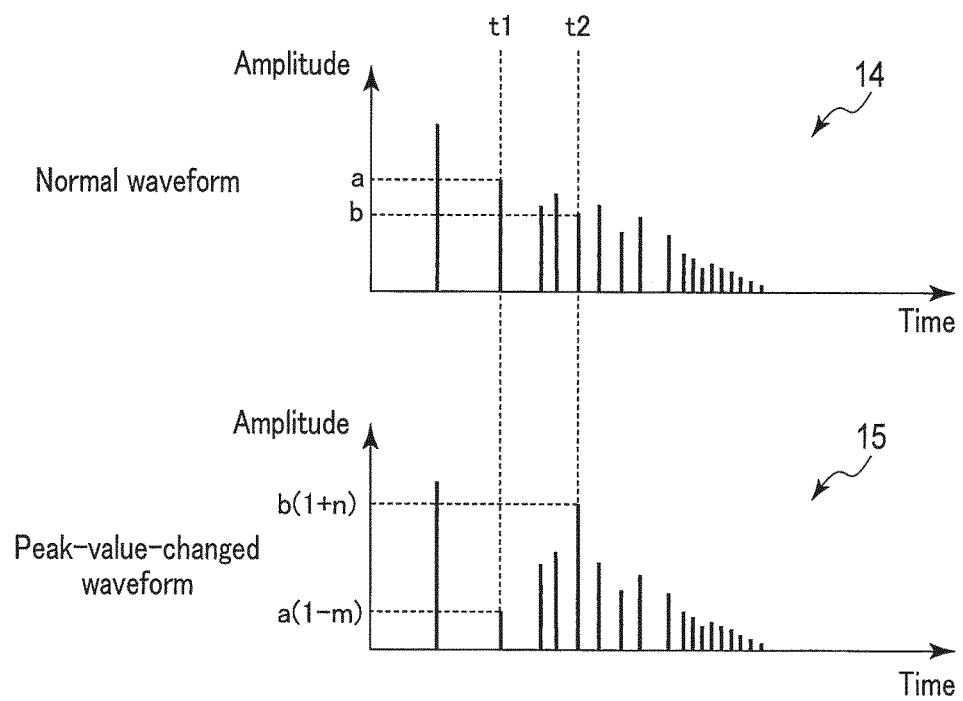
FIG. 6 is a diagram illustrating another method of generating a pseudo impulse response according to the first embodiment.

FIG. 6 is a diagram illustrating another method of generating a pseudo impulse response according to the first embodiment. FIG. 6 illustrates waveforms 14 and 15 of two impulse responses. A waveform 14 is, for example, actually obtained as environmental information. The waveform 15 is obtained by changing the peak value of the waveform 14.

The pseudo impulse response generation unit 141 generates a peak-value-changed waveform by changing the peak value of the waveform 14 of the impulse response. Specifically, the pseudo impulse response generation unit 141 changes an amplitude a of the peak value of the waveform 14 at time t1 to an amplitude a (1−m) by multiplying the amplitude a by (1−m). The pseudo impulse response generation unit 141 changes an amplitude b of the peak value of the waveform 14 at time t2 to an amplitude b (1+n) by multiplying the amplitude b by (1+n). At this time, m and n are random real numbers ranging from, for example, "0" to "1". Also, it is desirable that n and m be on the order of "0.01".

Next, a method of generating, when the environmental information contains information on the breadth of the space in the speech collection environment, a plurality of pseudo impulse responses based on the information on the breadth of the space and the reverberation time of the space will be described. Let us virtually assume a situation in which a speech source and a microphone are arranged at a random position in the space based on the information on the breadth of the space. The pseudo impulse response generation unit 141 calculates, for example, a reverberation time in advance from the input speech data based on the technique of Reference 2, and generates a pseudo impulse response based on the technique of Reference 1 using the positions of the speech source and the microphone that are virtually arranged. By variously changing the arrangements of the speech source and the microphone, the pseudo impulse response generation unit 141 is capable of generating various types of pseudo impulse responses.

(Step ST132)

After generating the pseudo impulse response, the pseudo input speech data generation unit 142 generates pseudo input speech data based on the generic speech data and the pseudo impulse response.

When, for example, M items of generic speech data (a plurality of items of generic speech data) and N pseudo impulse responses (a plurality of pseudo impulse responses) are prepared, M×N items of pseudo input speech data at maximum (a plurality of items of pseudo input speech data) can be generated. At this time, the plurality of items of pseudo input speech data can be represented by formula (2) as follows:

$$x_{m,n}(t) = s_{m,n}(t) * h_{m,n}(t) \quad (1 \leq m \leq M, 1 \leq n \leq N) \tag{2}$$

In formula (2), "t" denotes an index of time, "$s_{m,n}(t)$" denotes generic speech data, "$h_{m,n}(t)$" denotes a pseudo impulse response, "*" denotes a convolution operation, and "$x_{m,n}(t)$" denotes pseudo input speech data. Accordingly, the pseudo input speech data generation unit 142 is capable of generating a plurality of items of pseudo input speech data by performing a convolution operation of multiple combinations of the plurality of items of generic speech data and the plurality of items of pseudo impulse responses. The generic speech data and the pseudo impulse response to be targets of operations may be associated with one another in advance.

(Step ST133)

After generating the pseudo input speech data, the adaptive learning unit 143 generates an adapted acoustic model by adapting the pseudo input speech data to the base acoustic model. After step ST133, the processing advances to step ST140 in FIG. 3.

(Step ST140)

The speech recognition apparatus 100 acquires input speech data from the speech collection device 300.

(Step ST150)

After acquiring the input speech data, the speech recognition unit 160 generates a speech recognition result based on the input speech data and the adapted acoustic model. Specifically, the speech recognition unit 160 subjects the input speech data to a speech recognition process using the adapted acoustic model, and thereby generates a speech recognition result.

(Step ST160)

After generating the speech recognition result, the speech recognition apparatus 100 outputs the speech recognition result to the output device 400. After step ST160, the processing ends.

In the flowchart in FIG. 3, a step for determining a given timing may be provided between step ST130 (or step ST133) and step ST140.

As described above, the speech recognition apparatus according to the first embodiment generates, based on sensor information, environmental information relating to an environment in which the sensor information has been acquired, generates an adapted acoustic model obtained by adapting a base acoustic model to the environment based on the environmental information and generic speech data, acquires speech uttered in the environment as input speech data, and subjects the input speech data to a speech recognition process using the adapted acoustic model.

Accordingly, the speech recognition apparatus according to the first embodiment is capable of performing speech recognition using an acoustic model adapted to the speech collection environment, even when the amount of speech data recorded in the speech collection environment of the speech data that is to be a target of recognition is small. Therefore, the speech recognition apparatus according to the first embodiment is capable of improving the speech recognition properties in the speech collection environment.

Second Embodiment

The speech recognition apparatus according to the first embodiment performs a speech recognition process after an environment adaptation process. That is, the environment adaptation process and the speech recognition process are performed separately. On the other hand, the speech recognition apparatus according to the second embodiment performs an environment adaptation process and a speech recognition process together.

Specifically, the speech recognition apparatus according to the second embodiment performs speech recognition using a base acoustic model in a speech recognition process until the environment adaptation process is completed, and performs, after completion of the environment adaptation process, speech recognition using the adapted acoustic model in the speech recognition process. At this time, the speech recognition apparatus according to the second embodiment uses, for example, a passage of time relating to performance of the environment adaptation process to determine a completion of the environment adaptation process.

Figure 7:
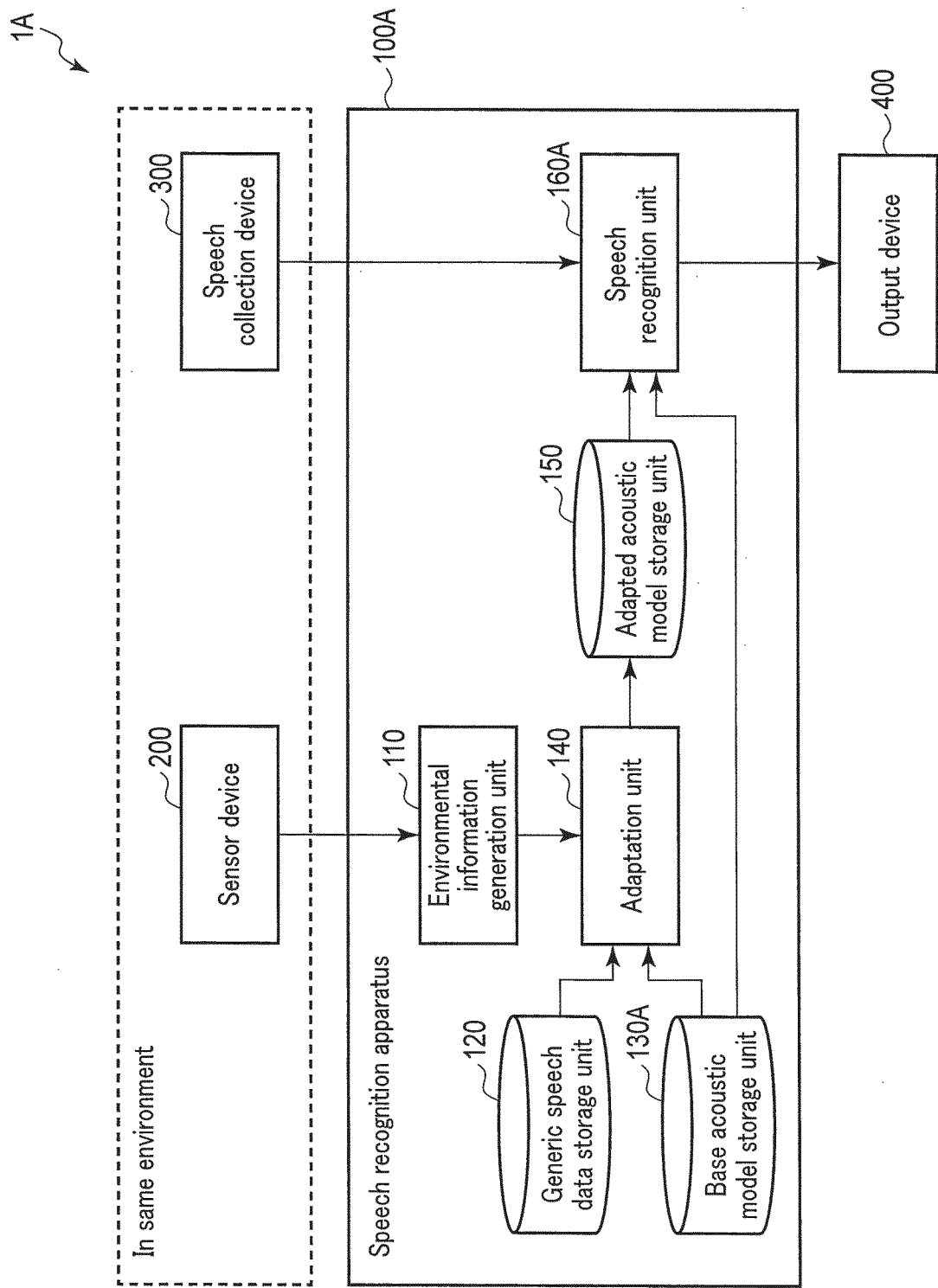
FIG. 7 is a block diagram illustrating a configuration of a speech recognition system which includes a speech recognition apparatus according to a second embodiment.

FIG. 7 is a block diagram illustrating a configuration of a speech recognition system which includes a speech recognition apparatus according to the second embodiment. A speech recognition system 1A includes a speech recognition apparatus 100A, a sensor device 200, a speech collection device 300, and an output device 400.

The speech recognition apparatus 100A comprises an environmental information generation unit 110, a generic speech data storage unit 120, a base acoustic model storage unit 130A, an adaptation unit 140, an adapted acoustic model storage unit 150, and a speech recognition unit 160A.

The base acoustic model storage unit 130A stores a base acoustic model. The base acoustic model storage unit 130A outputs the base acoustic model to the adaptation unit 140 and the speech recognition unit 160A.

The speech recognition unit 160A receives input speech data from the speech collection device 300, receives the base acoustic model from the base acoustic model storage unit 130A, and receives the adapted acoustic model from the adapted acoustic model storage unit 150. When a predetermined criterion for generation of an adapted acoustic model is not satisfied, the speech recognition unit 160A subjects the input speech data to a speech recognition process using the base acoustic model, and thereby generates a speech recognition result. When the predetermined criterion for generation of the adapted acoustic model is satisfied, the speech recognition unit 160A subjects the input speech data to a speech recognition process using the adapted acoustic model, and thereby generates a speech recognition result. The predetermined criterion for generation of the adapted acoustic model is, for example, a period of time required to adapt the base acoustic model to the speech collection environment. The speech recognition unit 160A outputs the generated speech recognition result to the output device 400.

Figure 8:
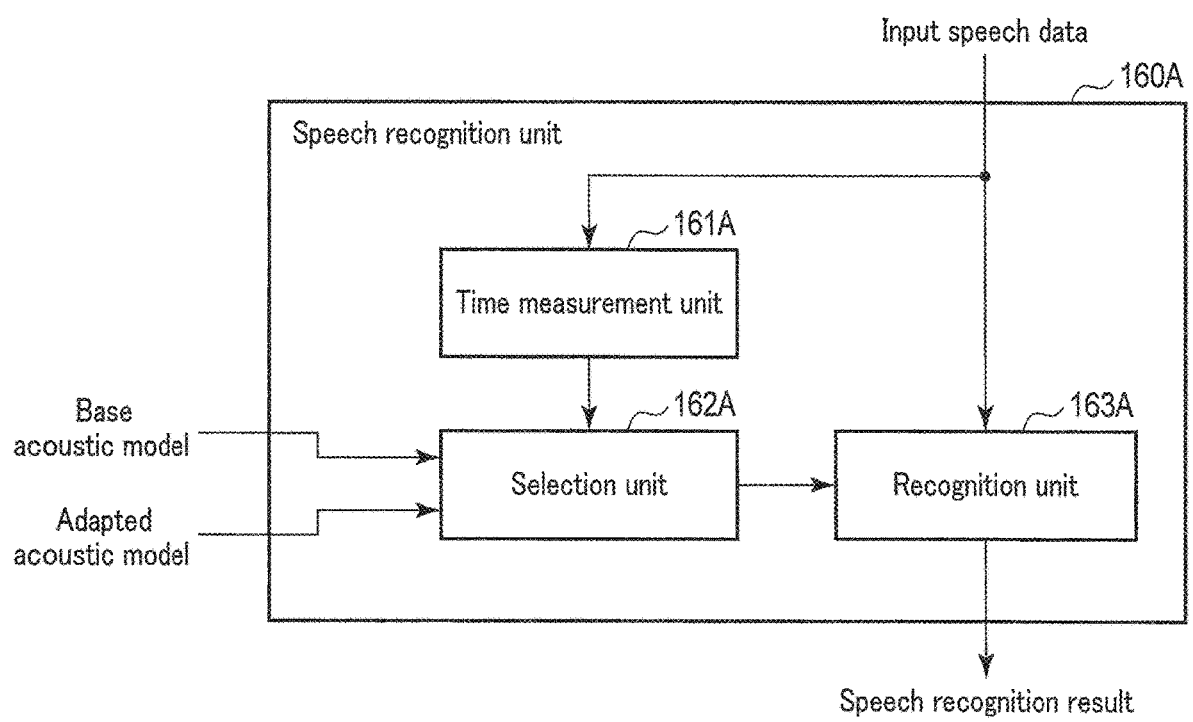
FIG. 8 is a block diagram illustrating a configuration of a speech recognition unit of the speech recognition apparatus according to the second embodiment.

FIG. 8 is a block diagram illustrating a configuration of a speech recognition unit of the speech recognition apparatus according to the second embodiment. The speech recognition apparatus according to the second embodiment comprises a speech recognition unit 160A instead of the speech recognition unit 160. The speech recognition unit 160A comprises a time measurement unit 161A, a selection unit 162A, and a recognition unit 163A.

The time measurement unit 161A inputs input speech data from the speech collection device 300. The time measurement unit 161A measures a period of time from start of the input of the input speech data. After a predetermined period of time has passed from start of the time measurement, the time measurement unit 161A outputs a completion trigger to the selection unit 162A. The predetermined period of time is, for example, a period of time required to adapt a base acoustic model to the speech collection environment, and may be discretionarily set. The time measurement unit 161A may measure a period of time during which input speech data of speech that is actually being uttered is input, taking into account the period of time when no speech is being uttered. This is preferable in the case where the sensor information used in an environment adaptation process is based on the input speech data.

The selection unit 162A receives a base acoustic model from the base acoustic model storage unit 130A, receives an adapted acoustic model from the adapted acoustic model storage unit 150, and receives a completion trigger from the time measurement unit 161A. The selection unit 162A determines, based on a completion trigger, whether or not a predetermined period of time has passed based on the completion trigger, and selects the base acoustic model or the adapted acoustic model. Specifically, the selection unit 162A selects the base acoustic model prior to the reception of the completion trigger, and selects the adapted acoustic model after the reception of the completion trigger. The selection unit 162A outputs the base acoustic model or the adapted acoustic model to the recognition unit 163A.

The recognition unit 163A receives input speech data from the speech collection device 300, and receives the base acoustic model or the adapted acoustic model from the selection unit 162A. The recognition unit 163A subjects the input speech data to a speech recognition process using the base acoustic model or the adapted acoustic model, and thereby generates a speech recognition result. The recognition unit 163A outputs the generated speech recognition result to the output device 400. The recognition unit 163A may associate the generated speech recognition result with information relating to the acoustic model. The information on the acoustic model indicates, for example, whether the generated speech recognition result is based on the base acoustic model or the adapted acoustic model.

Figure 9:
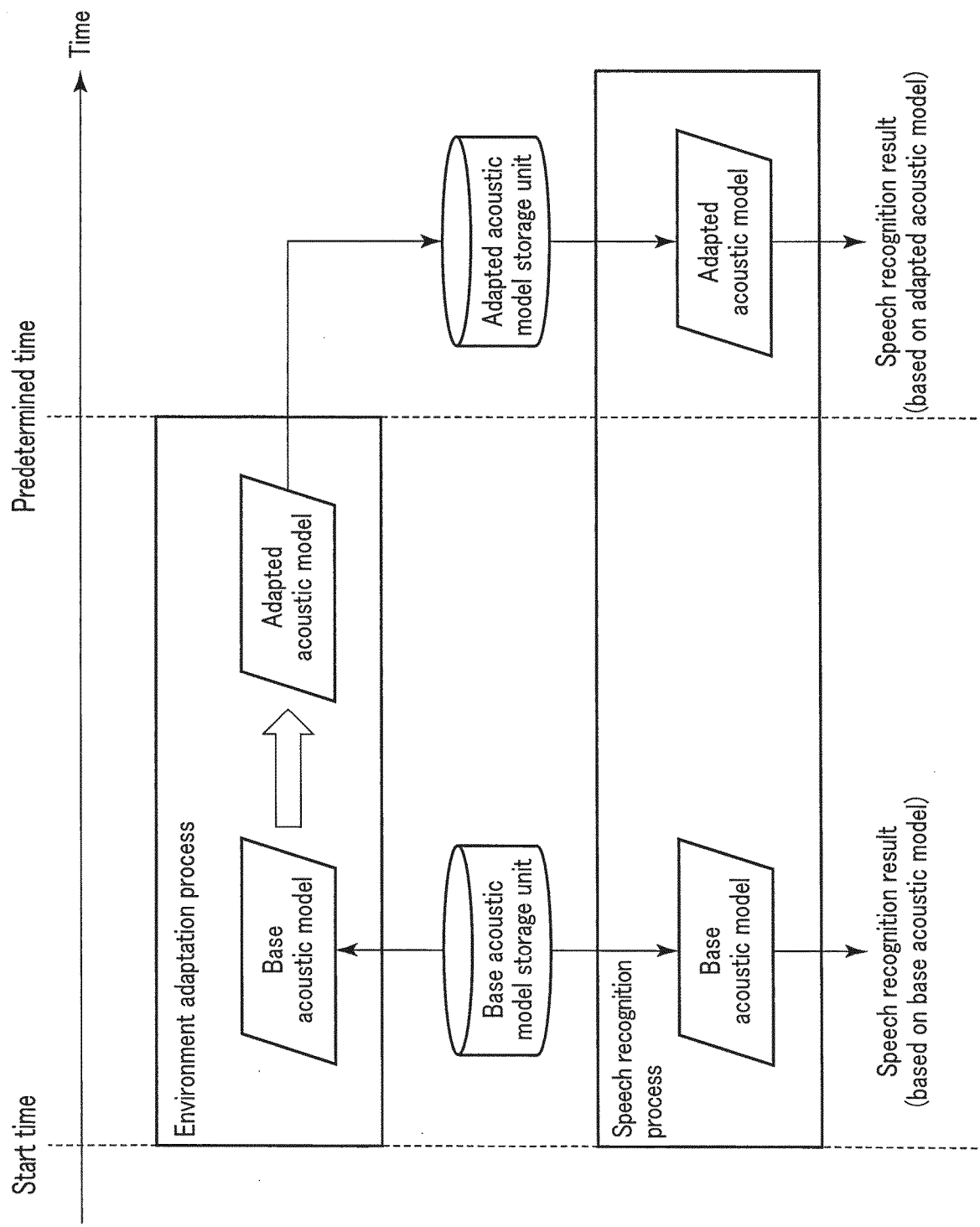
FIG. 9 is a diagram illustrating an operation example of the speech recognition apparatus according to the second embodiment.

FIG. 9 is a diagram illustrating an operation example of the speech recognition apparatus according to the second embodiment. The speech recognition apparatus 100A according to the second embodiment performs, for example, an environment adaptation process and a speech recognition process together at the start time. Until a predetermined period of time passes, the speech recognition apparatus 100A generates a speech recognition result using the base acoustic model by subjecting the input speech data to a speech recognition process using the base acoustic model, and continues to learn a parameter of the base acoustic model through an environment adaptation process. After the predetermined period of time has passed, the speech recognition apparatus 100A generates an adapted acoustic model obtained by learning a parameter of the base acoustic model, and generates a speech recognition result using the adapted acoustic model by subjecting the input speech data to a speech recognition process using the adapted acoustic model.

FIG. 10 is a flowchart illustrating an operation of a speech recognition process according to the second embodiment. The flowchart in FIG. 10 is performed, for example, together with the environment adaptation process of the flowchart in FIG. 3 (from step ST110 to step ST130).

(Step ST210)
The speech recognition apparatus 100A acquires input speech data from the speech collection device 300.

(Step ST220)
After acquiring the input speech data, the time measurement unit 161A measures a period of time from start of the input of the input speech data. After a predetermined period of time has passed since the start of the time measurement, the time measurement unit 161A outputs a completion trigger.

(Step ST230)
The selection unit 162A determines whether or not the predetermined period of time has passed. Specifically, the selection unit 162A determines that the predetermined period of time has passed upon reception of the completion trigger. The selection unit 162A determines that the predetermined period of time has not passed prior to reception of the completion trigger. When it is determined that the predetermined period of time has passed, the processing advances to step ST240. When it is determined that the predetermined period of time has not passed, the processing advances to step ST250.

(Step ST240)
After it is determined that the predetermined period of time has passed, the recognition unit 163A generates a speech recognition result based on the input speech data and the adapted acoustic model. Specifically, the recognition unit 163A subjects the input speech data to a speech recognition process using the adapted acoustic model, and thereby generates a speech recognition result.

(Step ST250)
After it is determined that the predetermined period of time has not passed, the recognition unit 163A generates a speech recognition result based on the input speech data and the base acoustic model. Specifically, the recognition unit 163A subjects the input speech data to a speech recognition process using the base acoustic model, and thereby generates a speech recognition result.

(Step ST260)
After generating the speech recognition result, the speech recognition apparatus 100A outputs the speech recognition result to the output device 400. After step ST260, the processing ends.

As described above, the speech recognition apparatus according to the second embodiment generates environmental information relating to an environment in which the sensor information has been acquired based on sensor information, generates an adapted acoustic model obtained by adapting a base acoustic model to the environment based on the environmental information and generic speech data, acquires speech uttered in the environment as input speech data, and subjects the input speech data to a speech recognition process using the adapted acoustic model, similarly to the speech recognition apparatus according to the first embodiment.

The speech recognition apparatus according to the second embodiment subjects input speech data to a speech recognition process using a base acoustic model when a predetermined criterion for generation of an adapted acoustic model is not satisfied, and subjects the input speech data to a speech recognition process using the adapted acoustic model when a predetermined criterion for generation of the adapted acoustic model is satisfied. The predetermined criterion is a period of time required to adapt the base acoustic model to the environment.

Accordingly, the speech recognition apparatus according to the second embodiment is expected to offer an advantageous effect similar to that of the speech recognition apparatus according to the first embodiment. In addition, since the speech recognition apparatus according to the second embodiment performs an environment adaptation process and a speech recognition process together, speech recognition can be performed even during the performance of the environment adaptation process.

Third Embodiment

The speech recognition apparatus according to the second embodiment uses, for example, a passage of time relating to performance of an environment adaptation process to determine completion of the environment adaptation process. On the other hand, a speech recognition apparatus according to a third embodiment uses reliability of speech recognition in a speech recognition process to determine completion of an environment adaptation process.

FIG. 11 is a block diagram illustrating a configuration of a speech recognition unit of the speech recognition apparatus according to the third embodiment. The speech recognition apparatus according to the third embodiment comprises a speech recognition unit 160B instead of the speech recognition unit 160A according to the second embodiment. The speech recognition unit 160B comprises a first recognition unit 161B, a first reliability calculation unit 162B, a second recognition unit 163B, a second reliability calculation unit 164B, a reliability comparison unit 165B, and a selection unit 166B.

The speech recognition unit 160B receives input speech data from the speech collection device 300, receives the base acoustic model from the base acoustic model storage unit 130A, and receives the adapted acoustic model from the adapted acoustic model storage unit 150. The speech recognition unit 160B generates a first speech recognition result by subjecting the input speech data to a speech recognition process using the base acoustic model, and generates a second speech recognition result by subjecting the input speech data to a speech recognition process using the adapted acoustic model. The speech recognition unit 160B outputs the first speech recognition result or the second speech recognition result to the output device 400.

The first recognition unit 161B receives input speech data from the speech collection device 300, and receives a base acoustic model from the base acoustic model storage unit 130A. The first recognition unit 161B generates a first speech recognition result by subjecting the input speech data to a speech recognition process using the base acoustic model. The first recognition unit 161B outputs the generated first speech recognition result to the first reliability calculation unit 162B and the selection unit 166B. The first recognition unit 161B may associate the generated speech recognition result with information relating to the acoustic model.

The first reliability calculation unit 162B receives a first speech recognition result from the first recognition unit 161B. The first reliability calculation unit 162B calculates a first reliability based on the first speech recognition result. For the calculation of the reliability, a generally known technique such as comparison with a syllable model or a competitive phoneme model, comparison of the posterior probability of candidates for recognition results obtained by the N-best list approach and the word-graph based approach, etc. may be used. The first reliability calculation unit 162B outputs a first reliability to the reliability comparison unit 165B.

The second recognition unit 163B receives input speech data from the speech collection device 300, and receives the adapted acoustic model from the adapted acoustic model storage unit 150. The second recognition unit 163B subjects the input speech data to a speech recognition process using the adapted acoustic model, and thereby generates a second speech recognition result. The second recognition unit 163B outputs the generated second speech recognition result to the second reliability calculation unit 164B and the selection unit 166B. The second recognition unit 163B may associate the generated speech recognition result with information relating to the acoustic model.

The second reliability calculation unit 164B receives a second speech recognition result from the second recognition unit 163B. The second reliability calculation unit 164B calculates a second reliability based on the second speech recognition result. The second reliability calculation unit 164B outputs a second reliability to the reliability comparison unit 165B.

The reliability comparison unit 165B receives a first reliability from the first reliability calculation unit 162B, and receives a second reliability from the second reliability calculation unit 164B. The reliability comparison unit 165B makes a comparison between the first reliability and the second reliability, and thereby generates a selection signal. The selection signal contains, for example, information as to which of the first speech recognition result and the second speech recognition result is to be output. Specifically, the reliability comparison unit 165B generates a selection signal containing information about selecting a speech recognition result corresponding to either the first reliability or the second reliability, whichever is higher. The reliability comparison unit 165B outputs the generated selection signal to the selection unit 166B. Generation of the selection signal is not limited to the above-described configuration. For example, the reliability comparison unit 165B may generate, based on a ratio between one of the reliabilities and the other reliability, a selection signal that selects a speech recognition result corresponding to the higher reliability when a predetermined ratio is satisfied. In this case, the reliability comparison unit 165B may generate a selection signal containing information about selecting a first speech recognition result based on a base acoustic model until a predetermined ratio is satisfied, for example.

The selection unit 166B receives a first speech recognition result from the first recognition unit 161B, receives a second speech recognition result from the second recognition unit 163B, and receives a selection signal from the reliability comparison unit 165B. The selection unit 166B selects the first speech recognition result or the second speech recognition result based on the selection signal. The selection unit 166B outputs the first speech recognition result or the second speech recognition result to the output device 400. The selection unit 166B may associate the selected speech recognition result with information on the acoustic model.

Figure 12:
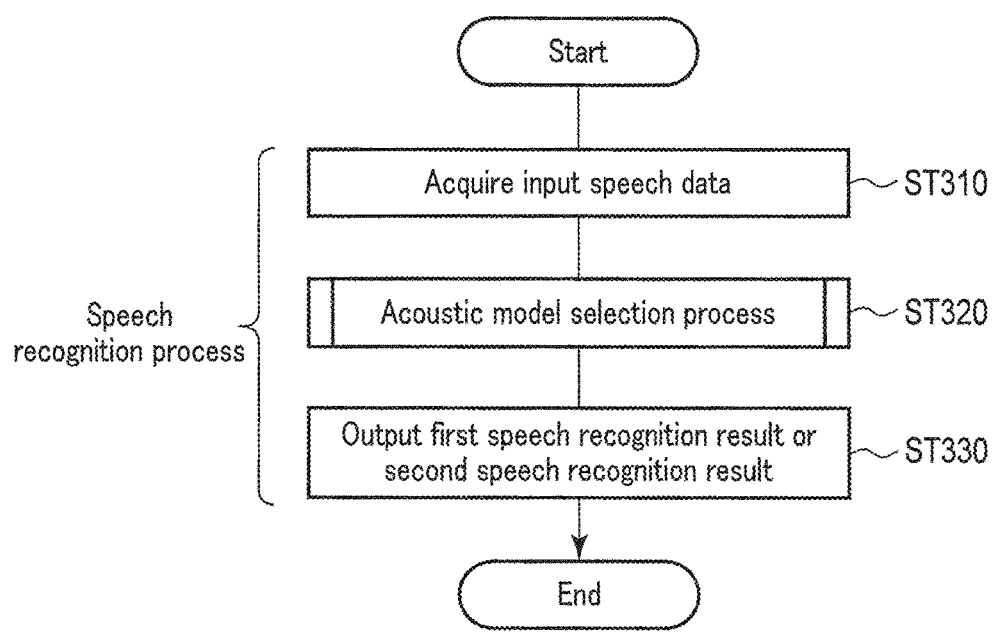
FIG. 12 is a flowchart illustrating a speech recognition process according to the third embodiment.

FIG. 12 is a flowchart illustrating a speech recognition process according to the third embodiment. The flowchart in FIG. 12 is performed, for example, together with the environment adaptation process (from step ST110 to step ST130) of the flowchart in FIG. 3.

(Step ST310)

The speech recognition apparatus 100A acquires input speech data from the speech collection device 300.

(Step ST320)

After acquiring the input speech data, the speech recognition unit 160B generates a first speech recognition result by subjecting the input speech data to a speech recognition process using the base acoustic model, generates a second speech recognition result by subjecting the input speech data to a speech recognition process using the adapted acoustic model, and selects either the first speech recognition result or the second speech recognition result. Hereinafter, the process at step ST320 will be referred to as an "acoustic model selection process". A specific example of the acoustic model selection process will be described with reference to the flowchart in FIG. 13.

Figure 13:
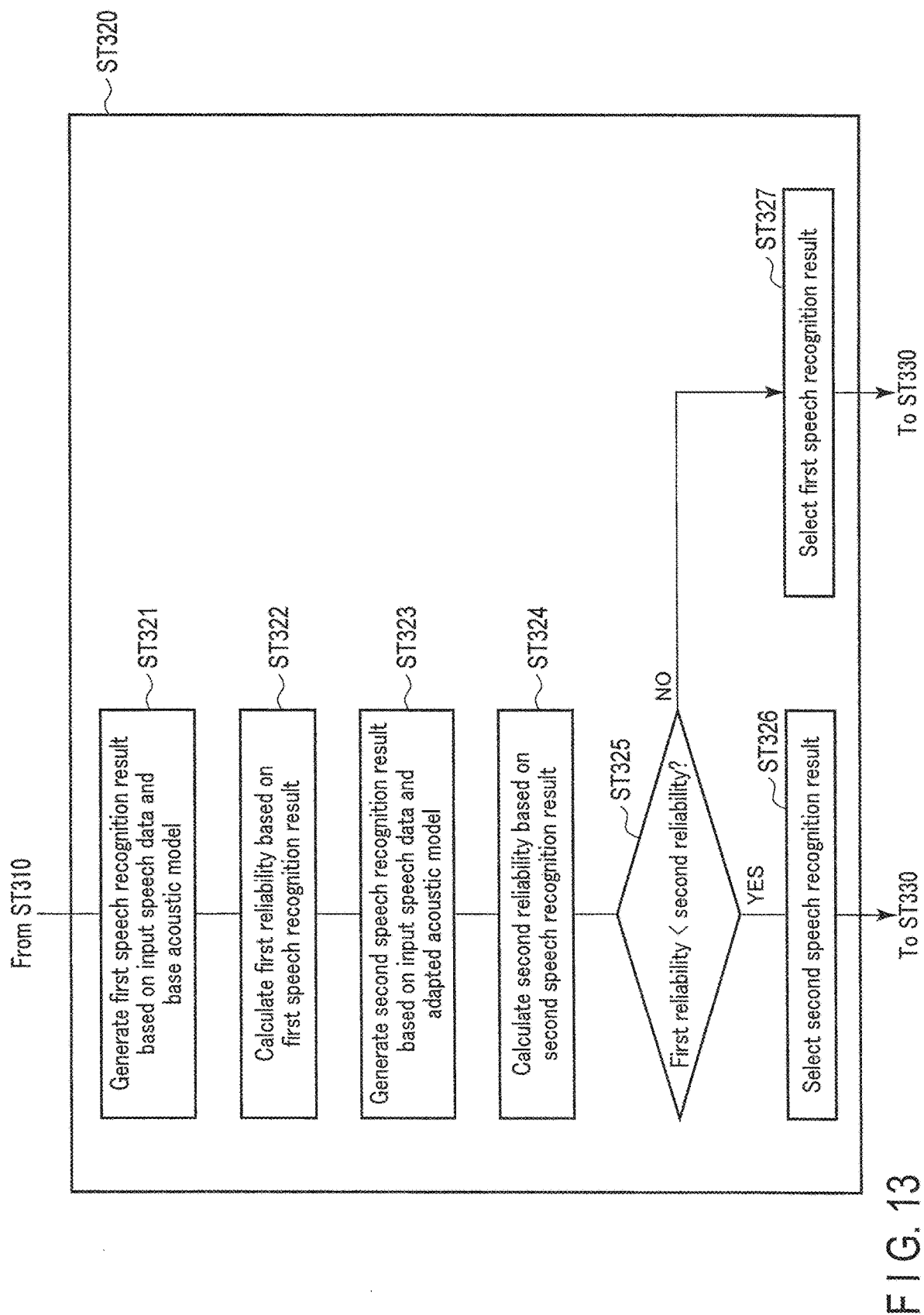
FIG. 13 is a flowchart illustrating an acoustic model selection process of the flowchart in FIG. 12.

FIG. 13 is a flowchart illustrating an acoustic model selection process of the flowchart in FIG. 12.

(Step ST321)

After acquiring the input speech data, the first recognition unit 161B generates a first speech recognition result based on the input speech data and the base acoustic model. Specifically, the first recognition unit 161B generates a first speech recognition result by subjecting the input speech data to a speech recognition process using the base acoustic model.

(Step ST322)

After generating the first speech recognition result, the first reliability calculation unit 162B calculates a first reliability based on the first speech recognition result.

(Step ST323)

After calculating the first reliability, the second recognition unit 163B generates a second speech recognition result based on the input speech data and the adapted acoustic model. Specifically, the second recognition unit 163B subjects the input speech data to a speech recognition process using the adapted acoustic model, and thereby generates a second speech recognition result.

(Step ST324)

After generating the second speech recognition result, the second reliability calculation unit 164B calculates a second reliability based on the second speech recognition result.

(Step ST325)

After calculating the second reliability, the reliability comparison unit 165B makes a comparison between the first reliability and the second reliability. Specifically, when the first reliability is less than the second reliability, the reliability comparison unit 165B generates a selection signal containing information about selecting the second speech recognition result. On the other hand, when the first reliability is less than the second reliability, the reliability comparison unit 165B generates a selection signal containing information about selecting the first speech recognition result. When it is determined that the first reliability is less than the second reliability, the processing advances to step ST326. When it is determined that the first reliability is not less than the second reliability, the processing advances to step ST327.

(Step ST326)

After it is determined that the first reliability is less than the second reliability, the selection unit 166B selects a second speech recognition result based on the selection signal containing the information about selecting the second speech recognition result. After step ST326, the processing advances to step ST330 in FIG. 12.

(Step ST327)

After it is determined that the first reliability is not less than the second reliability, the selection unit 166B selects a first speech recognition result based on the selection signal containing the information about selecting the first speech recognition result. After step ST327, the processing advances to step ST330 in FIG. 12.

(Step ST330)

After the first speech recognition result or the second speech recognition result is selected, the speech recognition apparatus 100A outputs the first speech recognition result or the second speech recognition result to the output device 400.

Steps ST323 and ST324 may be performed in parallel with steps ST321 and ST322. In this case, step ST310 continues to steps ST321 and ST323, and step ST322 continues to step ST325.

As described above, the speech recognition apparatus according to the third embodiment generates, based on sensor information, environmental information relating to an environment in which the sensor information has been acquired, generates an adapted acoustic model obtained by adapting a base acoustic model to the environment based on the environmental information and the generic speech data, acquires speech uttered in the environment as input speech data, and subjects the input speech data to a speech recognition process using the adapted acoustic model, similarly to the speech recognition apparatus according to the first embodiment.

Also, the speech recognition apparatus according to the third embodiment generates a first speech recognition result by subjecting the input speech data to a speech recognition process using the base acoustic model, calculates a first reliability based on the first speech recognition result, generates a second speech recognition result by subjecting the input speech data to a speech recognition process using the adapted acoustic model, calculates a second reliability based on the second speech recognition result, makes a comparison between the first reliability and the second reliability, and outputs the speech recognition result of either of the reliabilities, whichever is higher.

Accordingly, the speech recognition apparatus according to the third embodiment is expected to offer an advantageous effect similar to that of the speech recognition apparatuses according to the first and second embodiments. In addition, the speech recognition apparatus according to the third embodiment is capable of optimizing the time for performance of the environment adaptation process by calculating a reliability of the speech recognition result.

(Usage Example of Speech Recognition Apparatus)

Figure 14:
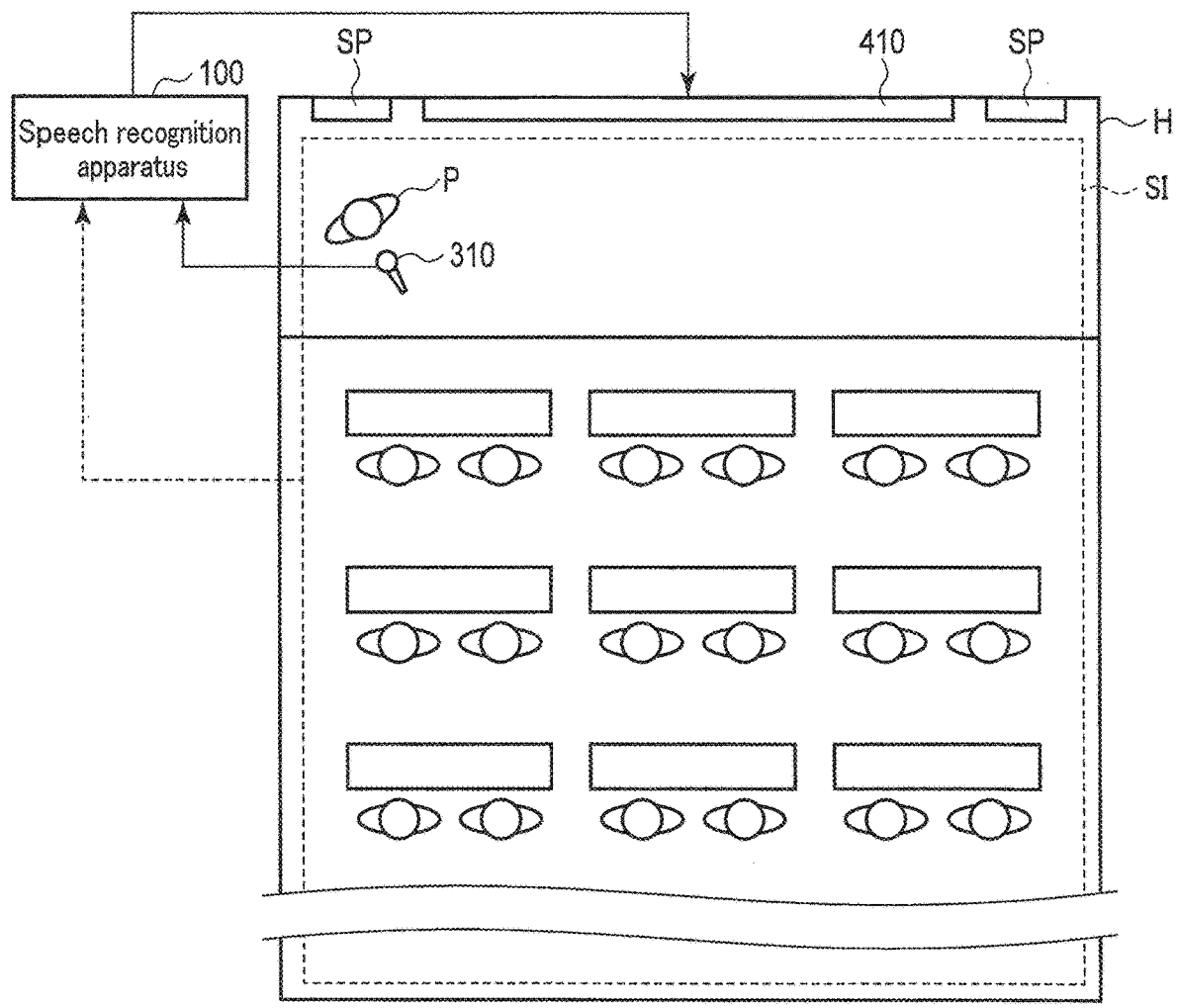
FIG. 14 is a diagram showing a usage example of the speech recognition apparatus according to the first to third embodiments.

FIG. 14 is a diagram showing a usage example of the speech recognition apparatus according to the first to third embodiments. FIG. 14 illustrates a state of a hall H of a lecture meeting as viewed from above. At the hall H, let us assume that a speaker P makes a speech at a microphone 310 placed on a lectern. The speech uttered by the speaker P is output via the microphone 310 to the speech recognition apparatus 100 (or the speech recognition apparatus 100A) as input speech data. The speech uttered by the speaker P is broadcast to the hall H via a speaker SP arranged in the hall H. This allows the input speech data to contain indirect sound from the speaker SP or reflected sound in the hall H as reverberation.

A sensor device (which is assumed to be, for example, the microphone 310 in FIG. 14) arranged at the hall H acquires sensor information SI (acoustic data) about the environment of the hall H, and outputs the acquired sensor information SI to the speech recognition apparatus 100. The speech recognition apparatus 100 generates environmental information (an impulse response) using the sensor information SI acquired from the microphone 310. The speech recognition apparatus 100 performs an environment adaptation process using the environmental information. The speech recognition apparatus 100 generates an adapted speech recognition model with the reduced reverberation effect through the environment adaptation process. The speech recognition apparatus 100 generates a speech recognition result from the input speech data using the generated adapted speech recognition model. The speech recognition apparatus 100 outputs the speech recognition result to the display 410 as a caption, for example.

Fourth Embodiment

In a fourth embodiment, a description will be made of application of the speech recognition apparatus according to the first to third embodiments to a smart speaker.

Figure 15:
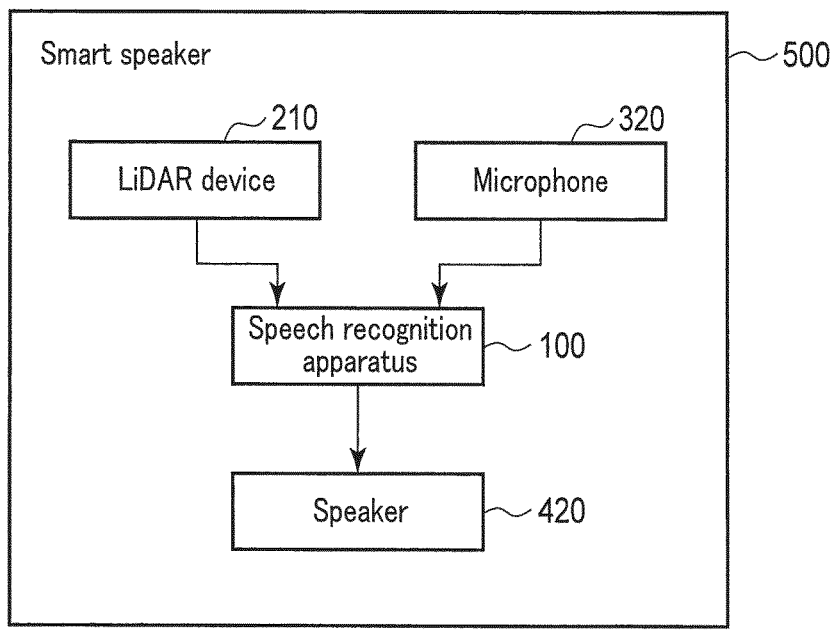
FIG. 15 is a block diagram illustrating a configuration of a smart speaker according to a fourth embodiment.

FIG. 15 is a block diagram illustrating a configuration of a smart speaker according to the fourth embodiment. A smart speaker 500 comprises a speech recognition apparatus 100 (or a speech recognition apparatus 100A), a LiDAR device 210, a microphone 320, and a speaker 420.

Figure 16:
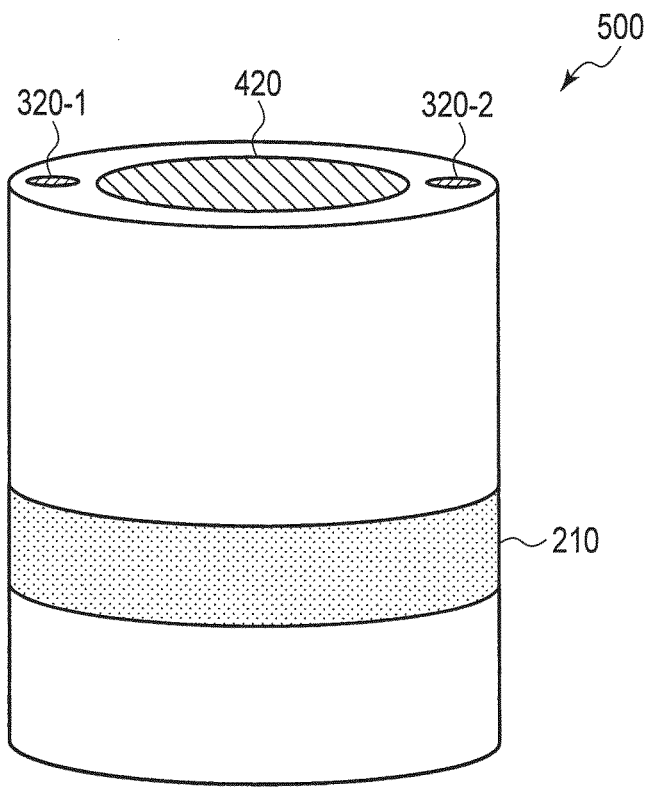
FIG. 16 is a diagram illustrating an outer appearance of the smart speaker of FIG. 15.

FIG. 16 is a diagram illustrating an outer appearance of the smart speaker of FIG. 15. The smart speaker 500 has, for example, a portrait-style cylindrical outer appearance. A window that allows emitted light and reflected light from the LiDAR device 210 is provided at least a portion of the outer periphery of the side surface of the smart speaker 500. A first microphone 320-1 and a second microphone 320-2, which function as microphones 320, and a speaker 420 are provided on an upper surface of the smart speaker 500. The speech recognition apparatus 100 is integrated into the smart speaker 500, and is thus not illustrated in FIG. 16.

The LiDAR device 210 acquires sensor information about the in-room environment, and outputs the sensor information to the speech recognition apparatus 100. The first microphone 320-1 acquires input speech data. The second microphone 320-2 acquires sensor information (acoustic data). Only one of the first microphone 320-1 and the second microphone 320-2 may be adopted to function as both. The acoustic data to be used as the sensor information need not necessarily be acquired.

The speech recognition apparatus 100 generates environmental information (an impulse response and breadth of a space) using the sensor information acquired from the second microphone 320-2 and the sensor information (point cloud data) acquired from the LiDAR device 210. The speech recognition apparatus 100 performs an environment adaptation process using the environmental information. The speech recognition apparatus 100 generates an adapted speech recognition model through an environment adaptation process, and generates a speech recognition result from the input speech data.

Figure 17:
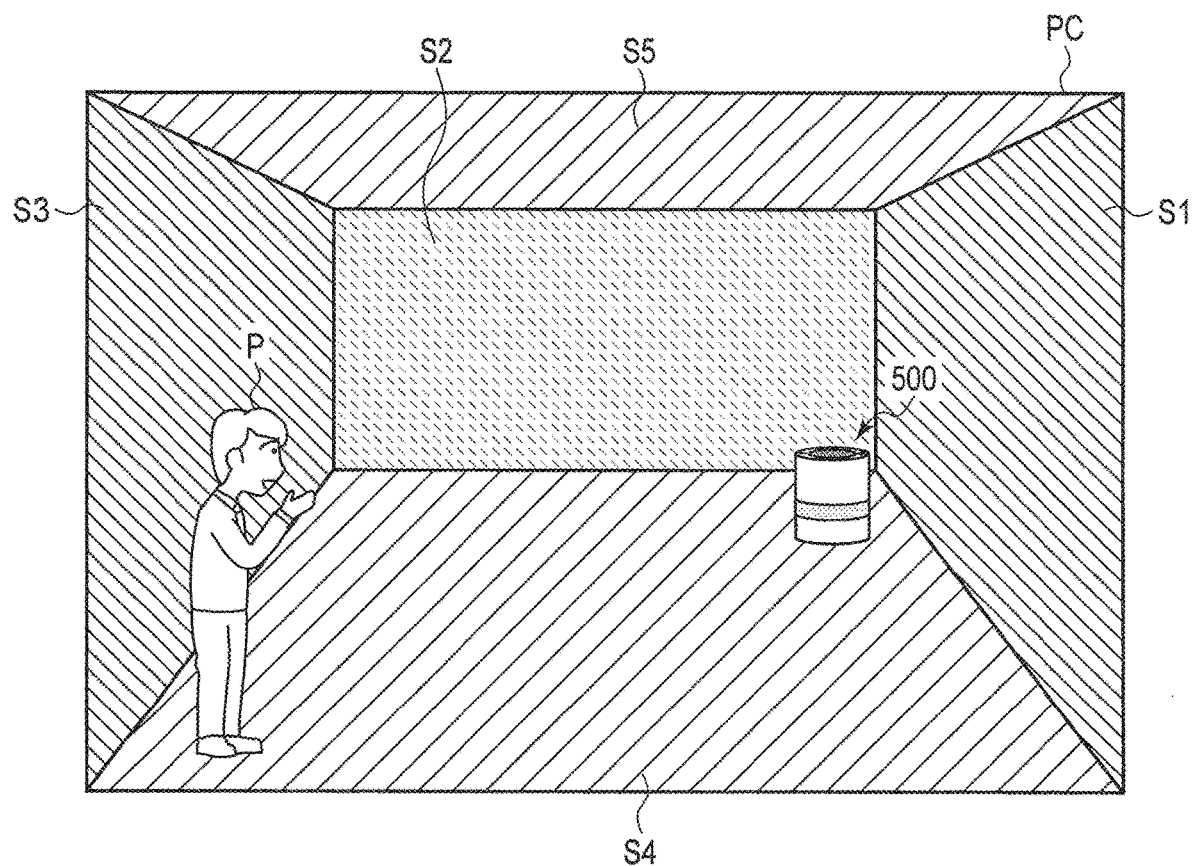
FIG. 17 is a diagram illustrating a usage example of the smart speaker in FIG. 15.

FIG. 17 is a diagram illustrating a usage example of the smart speaker in FIG. 15. FIG. 17 illustrates a state in which a smart speaker 500 is placed at the corner of a room PC. Let us assume, for example, that a speaker P makes a speech at the smart speaker 500 in the room PC. When the smart speaker 500 is activated, the speech recognition apparatus 100 integrated into the smart speaker 500 starts a speech recognition process and starts an environment adaptation process at the same time. In the environment adaptation process, the speech recognition apparatus 100 causes the LiDAR device 210 to acquire point cloud data on a plane of the room PC as sensor information. Specifically, the LiDAR device 210 acquires the point cloud data on the right wall, the back wall, the left wall, the floor, and the ceiling of the room PC as sensor information S1 to S5. For convenience in explanation, the front wall will be omitted. The speech recognition apparatus 100 generates information about the size of the space using the sensor information S1 to S5. The processes that follow are the same as those described above, and the descriptions thereof will be omitted.

As described above, the speech recognition apparatus according to the fourth embodiment is expected to offer an advantageous effect similar to those of the speech recognition apparatuses according to the first to third embodiments.

Figure 18:
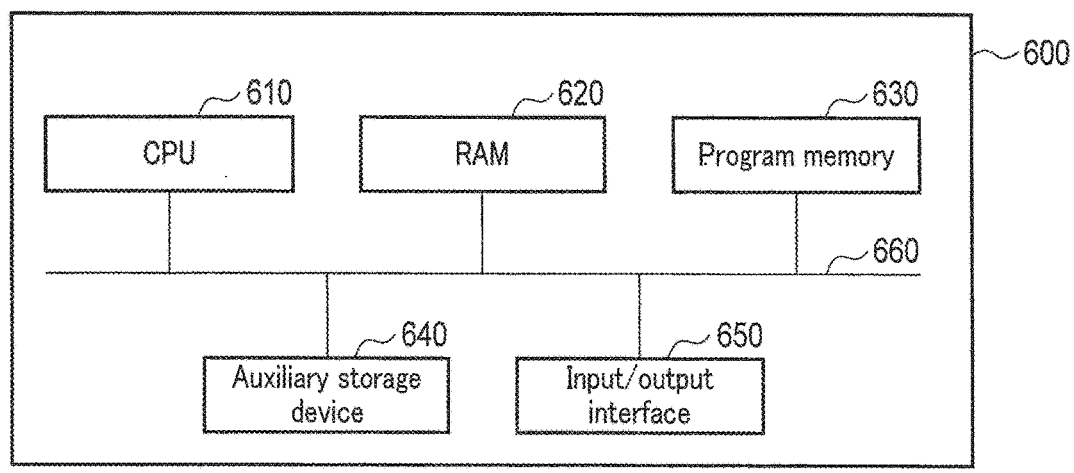
FIG. 18 is a block diagram illustrating a hardware configuration of a computer according to an embodiment.

FIG. 18 is a block diagram illustrating a hardware configuration of a computer according to an embodiment. The computer 600 comprises, as hardware, a central processing unit (CPU) 610, a random access memory (RAM) 620, a program memory 630, an auxiliary storage device 640, and an input/output interface 650. The CPU 610 performs communications with the RAM 620, the program memory 630, the auxiliary storage device 640, and the input/output interface 650 via the bus 660.

The CPU 610 is an example of a general-purpose processor. The RAM 620 is used as a working memory in the CPU 610. The RAM 620 includes a volatile memory such as a synchronous dynamic random-access memory (SDRAM). The program memory 630 stores various programs, including an environment adaptation process program and a speech recognition process program. For the program memory 630, a read-only memory (ROM), part of the auxiliary storage device 640, or a combination thereof, for example, is used. The auxiliary storage device 640 non-temporarily stores data. The auxiliary storage device 640 includes a nonvolatile memory such as an HDD or an SSD.

The input/output interface 650 is an interface that enables connection to another device. The input/output interface 650 is used, for example, for connection with the sensor device 200, the speech collection device 300, and the output device 400 shown in FIGS. 1 and 7, the connection of the microphone 310 with the display 410 shown in FIG. 14, and the connection of the LiDAR device 210, the microphone 320 (microphones 310-1 and 310-2 shown in FIG. 16), and the speaker 420 shown in FIG. 15.

Each program stored in the program memory 630 includes a computer-executable instruction. When executed by the CPU 610, the program (computer-executable instruction) causes the CPU 610 to perform a predetermined process. For example, when executed by the CPU 610, an operation estimation program causes the CPU 610 to perform, on the CPU 610, a series of processes described with reference to each of the members shown in FIGS. 1, 2, 7, 8 and 11.

The program may be provided in the computer 600 in a state of being stored in a computer-readable storage medium. In this case, the computer 600 further comprises a drive (not illustrated) which reads data from the storage medium, and acquires the program from the storage medium. Examples of the storage medium include a magnetic disc, an optical disk (CD-ROM, CD-R, DVD-ROM, or DVD-R, etc.), a magneto-optical disk (MO), and a semiconductor memory. The program may be stored in a server on a communication network, allowing the computer 600 to download the program from the server using the input/output interface 650.

The processing described in the embodiment is not limited to one that is performed by a general-purpose hardware processor such as the CPU 610 executing a program, and may be performed by a dedicated hardware processor such as an application-specific integrated circuit (ASIC). The term "processing circuitry (processing unit)" includes at least one general-purpose hardware processor, at least one dedicated hardware processor, and a combination of at least one general-purpose hardware processor and at least one dedicated hardware processor. In the example shown in FIG. 18, the CPU 610, the RAM 620, and the program memory 630 correspond to the processing circuitry.

According to the above-described embodiments, it is possible to improve the speech recognition properties.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech recognition apparatus comprising processing circuitry configured to:
   generate, based on sensor information, environmental information relating to an environment in which the sensor information has been acquired;
   generate, based on the environmental information and generic speech data, an adapted acoustic model obtained by adapting a base acoustic model to the environment;
   acquire speech uttered in the environment as input speech data; and
   subject the input speech data to a speech recognition process using the adapted acoustic model, and subject the input speech data to the speech recognition process using the base acoustic model when a predetermined criterion is not satisfied, the predetermined criterion being a period of time required to adapt the base acoustic model to the environment.

2. The apparatus according to claim 1, wherein the processing circuitry is further configured to:
   generate pseudo input speech data that mimics the speech uttered in the environment based on the environmental information and the generic speech data; and
   generate the adapted acoustic model using the pseudo input speech data.

3. The apparatus according to claim 2, wherein the processing circuitry is further configured to:
   generate, based on the environmental information, a pseudo impulse response that mimics an impulse response between a generation source of the speech and a speech collection device that collects the speech; and
   generate the pseudo input speech data based on the generic speech data and the pseudo impulse response.

4. The apparatus according to claim 3, wherein the environmental information contains information on a breadth of a space in the environment, and the processing circuitry is further configured to:
   calculate a reverberation time of the space based on the input speech data; and
   generate the pseudo impulse response based on the information on the breadth of the space and the reverberation time.

5. The apparatus according to claim 3, wherein the processing circuitry is further configured to generate the pseudo input speech data by performing a convolution operation of the generic speech data with the pseudo impulse response.

6. The apparatus according to claim 3, wherein
   the environmental information contains the impulse response, and
   the processing circuitry is further configured to generate the pseudo impulse response by performing a predetermined operation on the impulse response.

7. The apparatus according to claim 6, wherein the predetermined operation is at least one of an increase in a waveform of the impulse response in a time direction, a decrease in the waveform in the time direction, and a change in a peak value of the waveform.

8. The apparatus according to claim 1, wherein the sensor information contains acoustic data acquired by a speech collection device placed in the environment.

9. The apparatus according to claim 1, wherein the input speech data is acquired by the speech collection device.

10. The apparatus according to claim 1, wherein the sensor information includes at least one of image data and point cloud data acquired by an imaging device placed in the environment.

11. The apparatus according to claim 1, wherein the processing circuitry is further configured to generate the adapted acoustic model by optimizing a parameter of the base acoustic model.

12. The apparatus according to claim 11, wherein the generic speech data is speech data contained in training data for the base acoustic model.

13. The apparatus according to claim 1, wherein the processing circuitry is further configured to:
    generate a first speech recognition result by subjecting the input speech data to a speech recognition process using the base acoustic model;
    calculate a first reliability of the first speech recognition result based on the first speech recognition result;
    generate a second speech recognition result by subjecting the input speech data to a speech recognition process using the adapted acoustic model;
    calculate a second reliability of the second speech recognition result based on the second speech recognition result; and
    output the first speech recognition result or the second speech recognition result based on the first reliability or the second reliability.

14. The apparatus according to claim 13, wherein the processing circuitry is further configured to output a speech recognition result corresponding to either the first reliability or the second reliability, whichever is higher.

15. The apparatus according to claim 13, wherein the processing circuitry is further configured to output, when a ratio between the first reliability and the second reliability satisfies a predetermined ratio, a speech recognition result corresponding to the higher reliability.

16. A speech recognition method comprising:
    generating, based on sensor information, environmental information relating to an environment in which the sensor information has been acquired;
    generating, based on the environmental information and generic speech data, an adapted acoustic model obtained by adapting a base acoustic model to the environment;
    acquiring speech uttered in the environment as input speech data; and
    subjecting the input speech data to a speech recognition process using the adapted acoustic model, and subjecting the input speech data to the speech recognition process using the base acoustic model when a predetermined criterion is not satisfied, the predetermined criterion being a period of time required to adapt the base acoustic model to the environment.

17. A non-transitory computer-readable storage medium storing a program for causing a computer to execute processing comprising:
    generating, based on sensor information, environmental information relating to an environment in which the sensor information has been acquired;
    generating, based on the environmental information and generic speech data, an adapted acoustic model obtained by adapting a base acoustic model to the environment;
    acquiring speech uttered in the environment as input speech data; and
    subjecting the input speech data to a speech recognition process using the adapted acoustic model, and subjecting the input speech data to the speech recognition process using the base acoustic model when a predetermined criterion is not satisfied, the predetermined criterion being a period of time required to adapt the base acoustic model to the environment.

* * * * *